US012724778B2

(12) United States Patent
Nguyen et al.

(10) Patent No.: US 12,724,778 B2
(45) Date of Patent: Sep. 1, 2026

(54) SYSTEMS AND METHODS FOR INTELLIGENT ANALYTICS GENERATION IN A MULTI-TENANT SYSTEM

(71) Applicant: Zuora, Inc., Redwood City, CA (US)

(72) Inventors: Vu Hoang Nguyen, Redwood City, CA (US); Siva Kumar Govindarajan, Redwood City, CA (US); Neel Nitinkumar Mehta, Redwood City, CA (US); Samuel Doan, Redwood City, CA (US); Rodrigo Copetti, Redwood City, CA (US)

(73) Assignee: Zuora, Inc., Redwood City, CA (US)

( * ) Notice: Subject to any disclaimer, the term of this patent is extended or adjusted under 35 U.S.C. 154(b) by 0 days.

(21) Appl. No.: 19/060,631

(22) Filed: Feb. 21, 2025

(65) Prior Publication Data

US 2026/0252569 A1 Aug. 27, 2026

(51) Int. Cl.

*G06F 16/22* (2019.01)
*G06F 16/2455* (2019.01)
*G06F 16/2458* (2019.01)

(52) U.S. Cl.

CPC ...... *G06F 16/24556* (2019.01); *G06F 16/221* (2019.01); *G06F 16/2477* (2019.01)

(58) Field of Classification Search

CPC ............. G06F 16/24556; G06F 16/221; G06F 16/2477

See application file for complete search history.

(56) References Cited

U.S. PATENT DOCUMENTS 8,117,239 B2 * 2/2012 Fields ............... G06F 16/24556 707/803
8,655,723 B1 * 2/2014 Lilot .................. G06Q 30/0241 705/7.29
9,177,043 B2 * 11/2015 Dubey ................ G06F 16/2228
9,235,628 B2 * 1/2016 Johnson ............ G06F 16/24573
10,102,240 B2 * 10/2018 Balasubramanyan ....................... G06F 16/2365
11,675,845 B2 * 6/2023 Fort ....................... G06N 20/00 706/12
12,039,349 B1 * 7/2024 Agrawal ................... G06F 8/38
12,481,670 B2 * 11/2025 Mittal ................. G06F 16/2282
2008/0228829 A1 * 9/2008 Crutchfield ........... G06F 16/248
2012/0109947 A1 * 5/2012 Yu ......................... H04L 63/102 707/E17.084
2012/0130940 A1 * 5/2012 Gattani ................. G06F 16/283 707/791
2014/0012706 A1 * 1/2014 Foerster ................. G06Q 30/04 705/26.81
2015/0046204 A1 * 2/2015 Sitina ................... G06Q 10/063 705/7.11

(Continued)

*Primary Examiner* — Jorge A Casanova

(74) *Attorney, Agent, or Firm* — Fish & Richardson P.C.

(57) ABSTRACT

The multi-tenant system includes hardware processors that obtain consumption records, the consumption records including consumption event attributes and consumption event attribute values. The hardware processors generating, in each of the partitions, one or more consumption datasets based on the consumption records, the one or more consumption datasets comprising aggregated consumption metrics across the consumption records that satisfy a trigger condition. The hardware processors generating analytics results from the one or more consumption datasets and outputting the analytics results.

20 Claims, 19 Drawing Sheets

(56) References Cited

U.S. PATENT DOCUMENTS

2015/0106352 A1* 4/2015 Brown .................. G06F 16/254
707/706
2016/0308963 A1* 10/2016 Kung .................. H04L 67/1095
2018/0181712 A1* 6/2018 Ensey .................... G16H 50/20
2018/0181716 A1* 6/2018 Mander .................. G16H 50/20
2018/0181720 A1* 6/2018 Ensey .................... G16H 50/20
2019/0095241 A1* 3/2019 Ago ........................ G06F 9/468
2022/0027361 A1* 1/2022 Yamato, II .......... G06F 16/2455
2023/0041308 A1* 2/2023 Masala ................. G06F 16/213
2023/0334037 A1* 10/2023 Yamato, II .......... G06F 16/2264
2024/0411784 A1* 12/2024 Teyer .................. G06F 16/2474
2025/0217369 A1* 7/2025 Colcord .............. G06F 16/2457
2025/0321943 A1* 10/2025 Robichaud .............. G06F 16/24
2025/0355895 A1* 11/2025 Shmulyan ............. G06F 16/248
2026/0030228 A1* 1/2026 Zhu ..................... G06F 16/2272

* cited by examiner

Consumption Dataset 502

Aggregated Consumption Metrics – Tenant U, Subscriber S

| Aggregated Daily Consumption | Aggregated Weekly Consumption | Aggregated Monthly Consumption |
| --- | --- | --- |
| 1/1/2023: 20 | 1/1/2023-1/7/2023: 50 | 1/1/2023-1/31/2023: 100 |
| 1/4/2023: 30 | 1/8/2023-1/14/2023: 50 | |
| 1/9/2023: 50 | | |

Aggregated Consumption Metrics - Tenant U, Subscriber T

| Aggregated Daily Consumption | Aggregated Weekly Consumption | Aggregated Monthly Consumption |
| --- | --- | --- |
| 1/1/2023: 60 | 1/1/2023-1/7/2023: 60 | 1/1/2023-1/31/2023: 60 |

FIG. 5A

Consumption Dataset 522

Aggregated Consumption Metrics – Tenant V, Subscriber R

| Aggregated Daily Consumption | Aggregated Weekly Consumption | Aggregated Monthly Consumption |
|---|---|---|
| 1/1/2023: 60 | 1/1/2023-1/7/2023: 60 | 1/1/2023-1/31/2023: 130 |
| 1/8/2023: 70 | 1/8/2023-1/14/2023: 70 | |

Aggregated Consumption Metrics - Tenant V, Subscriber Q

| Aggregated Daily Consumption | Aggregated Weekly Consumption | Aggregated Monthly Consumption |
|---|---|---|
| 1/1/2023: 80 | 1/1/2023-1/7/2023: 80 | 1/1/2023-1/31/2023: 170 |
| 1/13/2023: 90 | 1/8/2023-1/14/2023: 90 | |

FIG. 5C

Consumption Dataset 532

Aggregated Consumption Metrics – Tenant V, Product K

| Aggregated Daily Consumption | Aggregated Weekly Consumption | Aggregated Monthly Consumption |
|---|---|---|
| 1/1/2023: 60 | 1/1/2023-1/7/2023: 60 | 1/1/2023-1/31/2023: 220 |
| 1/8/2023: 70 | 1/8/2023-1/14/2023: 160 | |
| 1/13/2023: 90 | | |

Aggregated Consumption Metrics - Tenant V, Product L

| Aggregated Daily Consumption | Aggregated Weekly Consumption | Aggregated Monthly Consumption |
|---|---|---|
| 1/1/2023: 80 | 1/1/2023-1/7/2023: 80 | 1/1/2023-1/31/2023: 80 |

Consumption Insights

Overview | Account Insights | Billable Usage | Meter Insights

Accounts with Expansion Opportunities ⓘ

Scores based on the last 12 months

Country ⌄ Customer Name ⌄ Revenue ⌄ Clear

| Customer Name | Country | Billable Usage | Opportunity Score ↓ | Actions |
|---|---|---|---|---|
| Yonghui Superstores | Japan | 20,310.72 USD | 100 | View |
| Weather Channel | Canada | 6,232,016.46 USD | 86 | View |
| Yum China Holdings | Canada | 7,855,554.10 USD | 79 | View |
| Vodafone | Canada | 3,280,767.45 USD | 77 | View |
| Vitals | China | 1,121,125.63 USD | 72 | View |
| VEON | United State | 1,607,063.44 USD | 72 | View |

| Product Rate Plan Name | Usage Trend | UOM |
|---|---|---|
| ▾ Contextual Tokens | | |
| Contextual Tokens | | 3,667,959 Tokens |
| ▾ Contextual Tokens (3M Commitment) | | |
| Contextual Tokens (3M Commitment) | | 897,764 Tokens |
| Contextual Tokens (3M Commitment) | | 3,000,000 Tokens |
| ▾ Training Tokens | | |
| Training Tokens | | 2,798,756 Tokens |
| ▾ Training Tokens (3M Commitment) | | |
| Training Tokens (3M Commitment) | | 805,433 Tokens |
| Training Tokens (3M Commitment) | | 3,000,000 Tokens |

FIG. 10

SYSTEMS AND METHODS FOR INTELLIGENT ANALYTICS GENERATION IN A MULTI-TENANT SYSTEM

TECHNICAL FIELD

This disclosure pertains to multi-tenant subscription data, and more particularly pertains to systems and methods for intelligent analytics generation, particularly related to multi-tenant consumption records, in a multi-tenant system.

BACKGROUND

Some multi-tenant systems store records of subscription-based data, such as resource consumption of subscribers under various subscriptions. These resources may include tangible and/or intangible resources, such as data utilization, data storage, media, goods, raw materials, energy, system accesses, and/or time. Each resource consumption event may be recorded as a consumption record. Considering the huge volume of consumption records, which may include billions of records in a month, systems and methods for generating analytics and efficiently processing queries related to the consumption records are needed.

SUMMARY

A claimed solution rooted in computer technology overcomes problems specifically arising in the realm of computer technology. Embodiments of the present invention implement an intelligent analytics generation system within a multi-tenant system. The intelligent analytics generation system within the multi-tenant system is configured to obtain subscription-based records. The subscription-based records may include consumption records, each of which may include consumption event attributes (tenant name, tenant identifier, subscriber name, subscriber identifier, time of consumption, unit of measure (UOM) of consumption, consumption amount, subscription product consumed, etc.) pertaining to a consumption event. In some embodiments, in a single time period, such as one month, the intelligent analytics generation system may receive consumption records pertaining to billions of events. The consumption records may have a structured format, e.g., a tabular, columnar, or hybrid format. The consumption records may be partitioned in separate storage partitions. The partitioning of the consumption records is based on criteria including a tenant, temporal attributes, and/or a schema of the consumption records. Partitioning the consumption records may include routing or assigning the consumption records to separate storage partitions according to the aforementioned criteria and/or according to any of the consumption event attributes.

The intelligent analytics generation system may generate one or more consumption metrics based on the consumption records in each of the separate storage partitions. The generated consumption metrics may be stored in or otherwise represented as consumption datasets. The generated consumption metrics may include consumption amounts aggregated across consumption records that satisfy a trigger condition (e.g., having a particular consumption event attribute value). The consumption amounts may be aggregated over different time periods or durations, which may be a fixed period and/or a rolling period. The intelligent analytics generation system may generate one or more consumption analytics based on the generated consumption metrics.

Generating one or more analytics may include generating scores and/or representations of the consumption metrics. In some embodiments, generating scores may be based on statistical analyses of the consumption metrics, which may include a Mann-Kendall test. In some embodiments, generating scores may be based on a trend and/or a degree of monotonicity over time of certain consumption metrics. The generated analytics may be outputted in a dashboard or a report.

The intelligent analytics generation system confers significant computing improvements. First, the intelligent analytics generation system summarizes a large corpus (e.g., billions) of consumption records within a dashboard or a report. Providing the summaries results in succinctly generating insights associated with the records, while greatly reducing the amount of computing resources that would otherwise be consumed in searching and retrieval of the records. Additionally, the summaries include insights of different levels of granularity, which are accessible on different types of computing devices having different amounts of processing resources and different screen sizes. This implements a versatile computing solution that works with different types of computing devices. Second, the intelligent analytics generation system prevents overburdening of the computing resources and that results in efficient generating and outputting of analytics. The intelligent analytics generation system conducts preprocessing of information so that all processing need not be performed at the time of the query, which would be more apt to cause system crashes and overheating. The intelligent analytics generation system performs preliminary tasks such as generating one or more consumption datasets. These preliminary tasks may be performed based on availability of computing resources and/or at specific times, such as a given time on certain days, weeks, or months. These preliminary tasks expedite a response time and reduce a consumption of computing resources to generate consumption analytics. Third, the intelligent analytics generation system implements an improved storage architecture. In this storage architecture, consumption records are partitioned into different storage partitions, which ensures security and efficient storage utilization among the different storage partitions. Fourth, the intelligent analytics generation system provides an improved storage format of consumption records and/or consumption datasets which improves efficiency of retrieval of relevant data within the consumption records and/or the consumption datasets.

In some embodiments, the present invention provides a multi-tenant system, comprising: one or more hardware processors; and memory storing computer instructions, the computer instructions when executed by the one or more hardware processors configured to perform: during a preprocessing phase, obtaining first consumption records for a first one of a plurality of different time windows, the first consumption records comprising first event attributes (e.g., first consumption event attributes) and first event attribute values (e.g., first consumption event attribute values), the first consumption records being partitioned into first partitions based on a first subset of the first event attribute values; generating, in each of the first partitions, for the first one of the plurality of different time windows, one or more first consumption datasets based on the first consumption records, the one or more first consumption datasets comprising first aggregated consumption metrics for the first one of the plurality of different time windows; obtaining second consumption records for a second one of a plurality of different time windows, the second consumption records comprising second event attributes (e.g., second consumption event attributes) and second event attribute values (e.g., second consumption event attribute values), the second consumption records being partitioned into second partitions based on a second subset of the second event attribute values; generating, in each of the second partitions, for the second one of the plurality of different time windows, one or more second consumption datasets based on the second consumption records, the one or more second consumption datasets comprising second aggregated consumption metrics for the second one of the plurality of different time windows; during an analytics generation phase, generating consumption analytics results from an evaluation of a trend across the first aggregated consumption metrics for the first one of the plurality of different time windows and the second aggregated consumption metrics for the second one of the plurality of different time windows; and outputting the consumption analytics results.

In some embodiments, the first event attributes may be the same as, or partially match, the second event attributes. In some embodiments, the generating of the one or more first consumption datasets comprises generating the first aggregated consumption metrics based on an aggregation of consumption amounts. The consumption amounts may be aggregated based on a first trigger condition. The consumption amounts may be aggregated across first consumption records that share a common particular first event attribute value (e.g., corresponding to a particular first event attribute such as a consumption subscriber), the particular first event attribute being distinct from at least a portion of a first subset of the first event attributes (e.g., corresponding to the first subset of the first event attribute values). In some embodiments, the first subset of the first event attributes includes a tenant. In some embodiments, the generating of the one or more second consumption datasets comprises generating the second aggregated consumption metrics based on an aggregation of consumption amounts. The consumption amounts may be aggregated based on the first trigger condition. The consumption amounts may be aggregated across second consumption records that share a common particular second event attribute value (e.g., corresponding to the particular first event attribute or a second event attribute such as a consumption subscriber), the particular second event attribute being distinct from at least a portion of the second subset of the second event attributes (e.g., corresponding to the second subset of the second event attribute values). In some embodiments, the first partitions may be the same as or partially in common with the second partitions (e.g., at least some of the first partitions may be a same partition space as the second partitions).

In some embodiments, the present invention may provide a method implemented by a multi-tenant system, the method comprising: during a preprocessing phase, obtaining first consumption records for a first one of a plurality of different time windows, the first consumption records comprising first event attributes and first event attribute values, the first consumption records being partitioned into first partitions based on a first subset of the first event attribute values; generating, in each of the first partitions, for the first one of the plurality of different time windows, one or more first consumption datasets based on the first consumption records, the one or more first consumption datasets comprising first aggregated consumption metrics for the first one of the plurality of different time windows; obtaining second consumption records for a second one of a plurality of different time windows, the second consumption records comprising second event attributes and second event attribute values, the second consumption records being partitioned into second partitions based on a second subset of the second event attribute values; generating, in each of the second partitions, for the second one of the plurality of different time windows, one or more second consumption datasets based on the second consumption records, the one or more second consumption datasets comprising second aggregated consumption metrics for the second one of the plurality of different time windows; during an analytics generation phase, generating consumption analytics results from an evaluation of a trend across the first aggregated consumption metrics for the first one of the plurality of different time windows and the second aggregated consumption metrics for the second one of the plurality of different time windows; and outputting the consumption analytics results.

In some embodiments, the first consumption records may be stored in a columnar format or a hybrid format. The first subset of the first event attribute values may be associated with a particular tenant. The first subset of the first event attribute values may be associated with a temporal attribute. The partitioning of the first consumption records may be further based on a schema associated with the first consumption records. The generating of the consumption analytics results may comprise evaluating a trend of an event attribute value over time. The evaluating of the trend of the aggregated event attribute value over time may be based on a degree of monotonicity of the trend. The evaluating of the trend of the trend of the aggregated event attribute value over time may be based on a Mann-Kendall statistical test. The evaluating of the trend of the trend of the aggregated event attribute value over time may be based on an aggregated consumption amount over time. The generating consumption analytics results may include aggregating consumption amounts for any of the first consumption records that have a first event attribute value of a common subscriber or a common subscription product.

In some embodiments, the consumption datasets are stored within a consumption records database, which is organized into a separated header section and a footer section, wherein the header section comprises consumption analytics and the footer section comprises metadata corresponding to the consumption analytics.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

FIGS. 5A-5D are diagrams illustrating generating of consumption datasets which contain consumption metrics, in accordance with some embodiments of the present invention.

FIGS. 6-12 are diagrams illustrating example outputs of consumption analytics, in accordance with some embodiments of the present invention.

DETAILED DESCRIPTION

Figure 1:
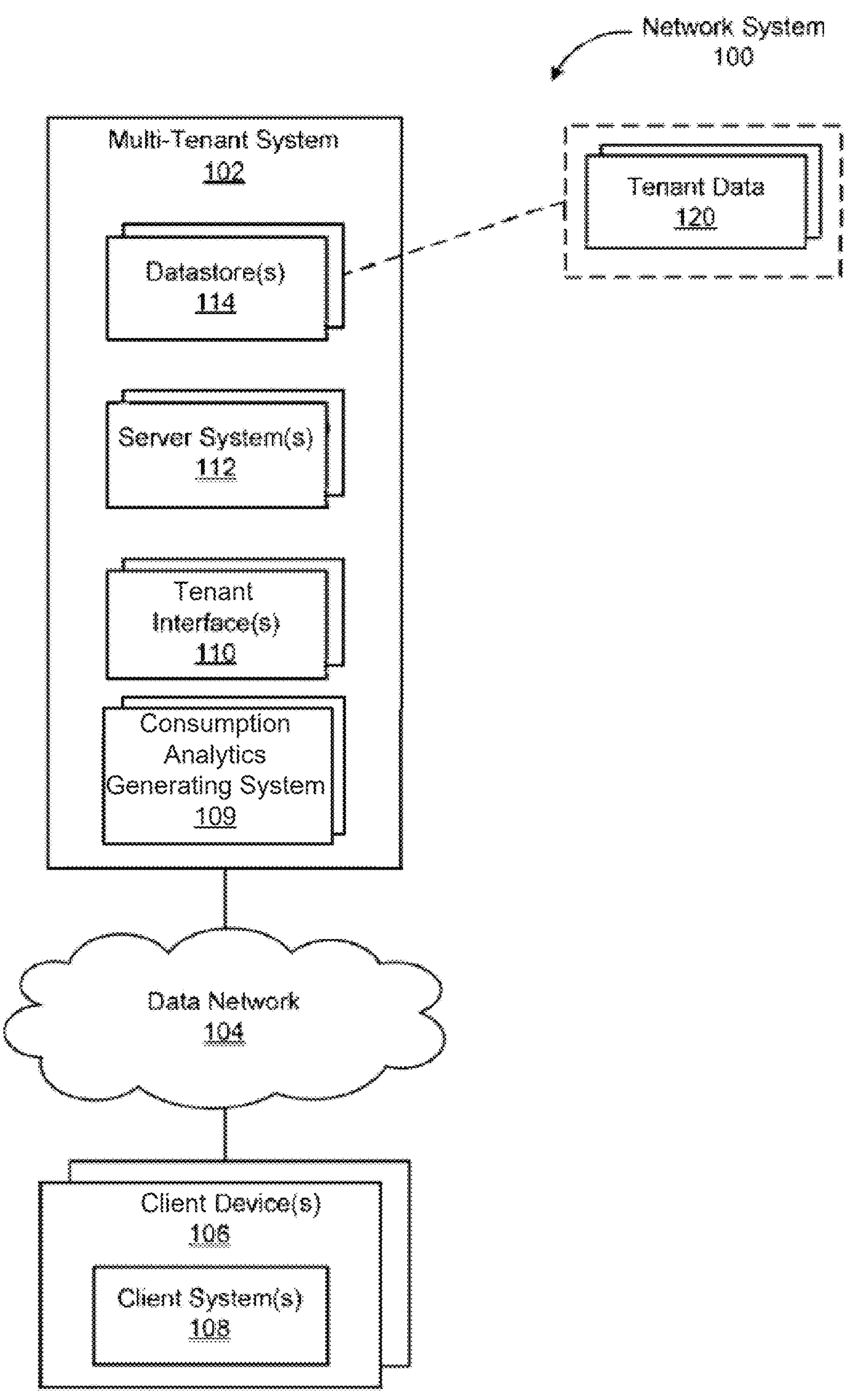
FIG. 1 is a block diagram of a network system for providing cloud-based software-as-a-service (SAAS) services of a multi-tenant system to multiple tenants, in accordance with some embodiments of the present invention.

A claimed solution rooted in computer technology overcomes problems specifically arising in the realm of computer technology. Embodiments of the present invention implement an intelligent analytics generation system within a multi-tenant system. The intelligent analytics generation system within the multi-tenant system is configured to obtain subscription-based records. The subscription-based records may include consumption records, each of which may include consumption event attributes (tenant name, tenant identifier, subscriber name, subscriber identifier, time of consumption, unit of measure (UOM) of consumption, consumption amount, subscription product consumed, etc.) pertaining to a consumption event. In some embodiments, in a single time period, such as one month, the intelligent analytics generation system may receive consumption records pertaining to billions of events. The consumption records may have a structured format, e.g., a tabular, columnar, or hybrid format. The consumption records may be partitioned in separate storage partitions. The partitioning of the consumption records is based on criteria including a tenant, temporal attributes, and/or a schema of the consumption records. Partitioning the consumption records may include routing or assigning the consumption records to separate storage partitions according to the aforementioned criteria and/or according to any of the consumption event attributes.

The intelligent analytics generation system may generate one or more consumption metrics based on the consumption records in each of the separate storage partitions. The generated consumption metrics may be stored in or otherwise represented as consumption datasets. The generated consumption metrics may include consumption amounts aggregated across consumption records that satisfy a trigger condition (e.g., having a particular consumption event attribute value). The consumption amounts may be aggregated over different time periods or durations, which may be a fixed period and/or a rolling period. The intelligent analytics generation system may generate one or more consumption analytics based on the generated consumption metrics.

Generating one or more analytics may include generating scores and/or representations of the consumption metrics. In some embodiments, generating scores may be based on statistical analyses of the consumption metrics, which may include a Mann-Kendall test. In some embodiments, generating scores may be based on a trend and/or a degree of monotonicity over time of certain consumption metrics. The generated analytics may be outputted in a dashboard or a report.

The intelligent analytics generation system confers significant computing improvements. First, the intelligent analytics generation system summarizes a large corpus (e.g., billions) of consumption records within a dashboard or a report. Providing the summaries results in succinctly generating insights associated with the records, while greatly reducing the amount of computing resources that would otherwise be consumed in searching and retrieval of the records. Additionally, the summaries include insights of different levels of granularity, which are accessible on different types of computing devices having different amounts of processing resources and different screen sizes. This implements a versatile computing solution that works with different types of computing devices. Second, the intelligent analytics generation system prevents overburdening of the computing resources and that results in efficient generating and outputting of analytics. The intelligent analytics generation system conducts preprocessing of information so that all processing need not be performed at the time of the query, which would be more apt to cause system crashes and overheating. The intelligent analytics generation system performs preliminary tasks such as generating one or more consumption datasets. These preliminary tasks may be performed based on availability of computing resources and/or at specific times, such as a given time on certain days, weeks, or months. These preliminary tasks expedite a response time and reduce a consumption of computing resources to generate consumption analytics. Third, the intelligent analytics generation system implements an improved storage architecture. In this storage architecture, consumption records are partitioned into different storage partitions, which ensures security and efficient storage utilization among the different storage partitions. Fourth, the intelligent analytics generation system provides an improved storage format of consumption records and/or consumption datasets which improves efficiency of retrieval of relevant data within the consumption records and/or the consumption datasets.

FIG. 1 is a block diagram of an example network system 100 for providing cloud-based software-as-a-service (SAAS) services of a multi-tenant system 102 to multiple tenants according to some embodiments. The teachings of FIG. 1 may be implemented in conjunction with any of the embodiments herein. Examples of cloud-based SAAS services include data storage, data processing, and business-oriented applications. In some embodiments, each tenant may be a subscription provider of resources (e.g., an internet service provider, a home security system and/or service provider, a cellular phone service provider, entertainment content provider, or provider of raw materials). Each tenant may additionally or alternatively include a group of one or more users (e.g., individuals, business entities, customers of the business entities, computing systems) who share access to the cloud-based services. In one embodiment, a tenant includes a service entity such as AT&T, Netflix, Verizon, and/or the like. A tenant may provide a subset of resources (e.g., products or services) of a larger entity. For example, AT&T internet products may be a particular tenant, and AT&T security products may be another tenant. In some embodiments, the cloud-based SAAS services include managing subscriber records, product and/or service consumption information, billing information, payment information, and/or the like.

The network system 100 includes the multi-tenant system 102 coupled via a data network 104 (e.g., a set of one or more public and/or private, wired and/or wireless networks) to client devices 106. The multi-tenant system 102 includes shared resources to host the cloud-based SAAS services to the tenants. The shared resources may include processors, memory, virtual systems, services, application programs, load balancers, firewalls, and/or the like. As shown, the multi-tenant system 102 includes tenant interfaces 110, server systems 112, datastores 114, and a consumption analytics generating system 109. Although the description describes analytics related to consumption records, the invention is not to be construed to be limited to consumption records. The description may also apply to any other multi-dimensional data such as subscription records, billing records, and/or other records. Each of the client devices 106 includes a client system 108 that accesses the cloud-based SAAS services hosted by the multi-tenant system 102. In some embodiments, the client system 108 may be operated by employees (e.g., administrator users) of the provider of the multi-tenant system 102. In some embodiments, the client system 108 may be operated by employees of the tenant. In some embodiments, the client system 108 may be operated by end users (subscribers) of the tenant's services. In some embodiments, the client system 108 may be operated by computing systems.

Each client device 106 may include a desktop, laptop, notebook, tablet, personal digital assistant, smart phone, or other consumer electronic device incorporating one or more computer components. The client system 108 on each client device 106 may include hardware, software and/or firmware for communicating with the multi-tenant system 102 and accessing the cloud-based services it hosts. Examples of the client system 108 may include web browsers, client engines, drivers, user interface components, proprietary interfaces, and/or the like.

The multi-tenant system 102 includes hardware, software and/or firmware to host the cloud-based services for the tenants. It will be appreciated that the multi-tenant system 102 may offer access to shared resources including systems and applications on shared devices and offer each tenant the same quality or varying qualities of service. In some embodiments, the multi-tenant system 102 does not use virtualization or instantiation processes. In some embodiments, a multi-tenant system 102 integrates several business computing systems into a common system with a view toward streamlining business processes and increasing efficiencies on a business-wide level.

In some embodiments, the multi-tenant system 102 includes a user interface tier of multiple tenant interfaces 110, a server tier of multiple server systems 112, and a datastore tier of multiple datastores 114 for the multiple tenants. In some embodiments, the tenant interfaces 110 includes graphical user interfaces and/or web-based interfaces to enable tenants to access the shared services hosted by the multi-tenant system 102. The tenant interfaces 110 may support load balancing when multiple tenants (and/or multiple customers of the tenants) try to access the multi-tenant system 102 concurrently. The tenant interfaces 110 may additionally or alternatively include an operator interface for use by a systems operator to configure or otherwise manage the multi-tenant system 102. In some embodiments, tenants may input one or more customized entries corresponding to event attribute fields, via the tenant interfaces 110 to be stored within datastores 114 and processed by the consumption analytics generating system 109. In some embodiments, each tenant may be associated with a subset of the total tenant interfaces 110 for load balancing. In some embodiments, within the tenant interfaces 110, tenants may provide customized entries related to customized event attributes (e.g., a procurement channel or delivery channel of the resources, a tenant identifier, a sector of the resources, a country in which the resources were consumed or delivered from, a method of delivery, a unit of measure (UOM) of consumption).

In some embodiments, the server systems 112 include hardware, software and/or firmware to host the shared services for tenants. The hosted services may include tenant-specific business services or functions, including enterprise resource planning (ERP), customer relationship management (CRM), eCommerce, Human Resources (HR) management, payroll, financials, accounting, calendaring, order processing, subscription billing, inventory management, supply chain management (SCM), collaboration, sales force automation (SFA), marketing automation, contact list management, call-center support, web-based customer support, partner and vendor management systems, product lifecycle management (PLM), financial, reporting and analysis, and/or the like. Similar to the tenant interfaces 110, in some embodiments, the server systems 112 may support load balancing when multiple tenants (and/or multiple customers of tenants) try to access the multi-tenant system 102 concurrently. Further, in some embodiments, each tenant may be associated with a subset of the total server systems 112 for load balancing. In some embodiments, the consumption analytics generating system 109 includes hardware, software and/or firmware to obtain, partition, consolidate, or aggregate consumption records in real-time, at certain time periods, and in a scalable manner, in preparation for generating of consumption analytics. For example, depending on a quantity of consumption records, the consumption analytics generating system 109 may adjust a frequency of performing the aforementioned operations on the consumption records. Example frequencies may be every thirty minutes, every hour, every few hours, every day, every week, every month or any other frequency, and/or any other frequency.

In some embodiments, tenant data 120 for each tenant may be partitioned and/or stored in a logical store across one or more datastores 114. In some embodiments, each tenant uses a logical store that is not assigned to any predetermined datastores 114. Each logical store may contain tenant data 120 that is used, generated and/or stored as part of providing tenant-specific business services or functions. In some embodiments, the datastores 114 may include relational database management systems (RDBMS), MySQL relational database systems, object-based database systems, and/or the like. In some embodiments, tenant data 120 may be stored across multiple datastores 114, with each datastore dedicated to a particular service (e.g., managing customer records, managing subscription records, managing product and/or service consumption information, managing billing information, managing payment information, and/or the like). In some embodiments, any of the datastores 114 may store information regarding any updates or event notifications. In some examples, the tenant data 120 may originally have been ingested into the datastores 114 from different sources (e.g., servers that host resources being provisioned by a tenant).

In some embodiments, the datastores 114 may include one or more virtual stores, such as cloud-based stores. The datastores 114 may store data as objects within buckets, which are containers for the objects. Each of the objects may be linked to a key which uniquely identifies an object. The objects may contain object data and metadata. The metadata may include a set of name-value pairs that describe each object.

Figure 4:
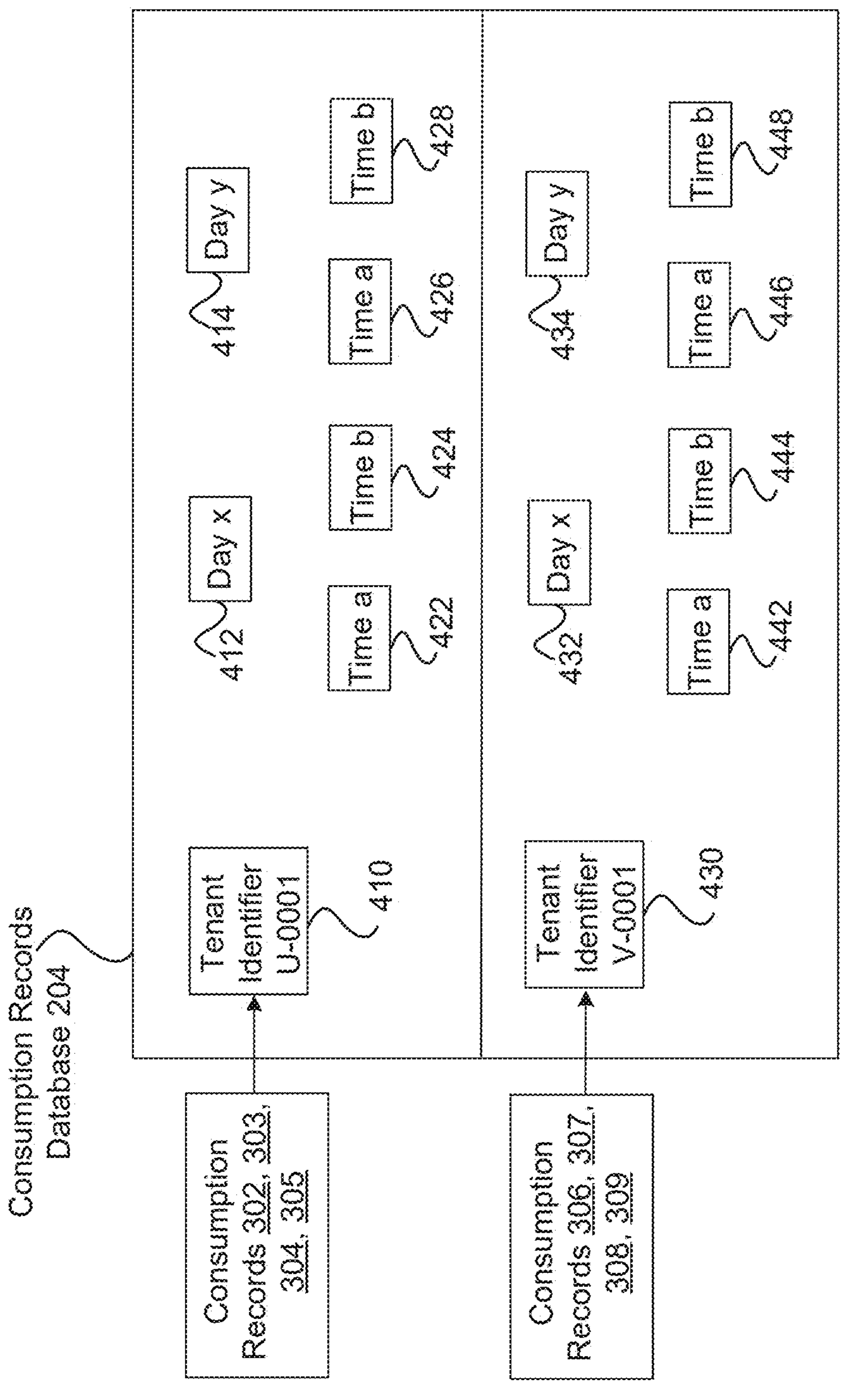
FIG. 4 is a diagram illustrating partitioning of consumption records, in accordance with some embodiments of the present invention.

In some embodiments, the datastores 114 may store any or all of consumption records, consumption datasets generated from consumption records, consumption analytics, and any portions or intermediate outputs thereof. In some embodiments, as illustrated in FIG. 4, the datastores 114 may include different storage partitions that may partition data into separate storage partitions for security and for easier access and retrieval.

In some embodiments, although the datastores 114, the server systems 112, the tenant interfaces 110, and the consumption analytics generating system 109 are shown separately, the separation is shown as merely an example of different aspects of the multi-tenant system 102. Any of the datastores 114, the server systems 112, the tenant interfaces 110, and the consumption analytics generating system 109 may be integrated together and/or communicate or collaborate with one another. For example, the server systems 112 and the consumption analytics generating system 109 may be integrated into a single system.

In some embodiments, the tenant data 120 may include records such as consumption records and subscription records. Subscription records include billing data, subscription status (e.g., active, canceled, suspended, re-activated), and/or geospatial data. In some embodiments, the tenant data 120 may include usage data (e.g., account activity data), such as new subscriptions, changes to subscribed products and/or services, cancellation of one or more products and/or services, subscriptions to new products and/or services, application of discounts, loyalty program package changes (e.g., additional programs and/or services, special rates, and/or the like for loyal customers), reduction or increase of rates for products and/or services, consumption records, and/or cancellation of the application. In some embodiments, account activity may include usage of a product and/or product of a subscriber (e.g., what programs or content the subscriber actually watches, what services and what level of consumption the subscriber receives, quality of the product and/or services, and/or the like).

In some embodiments, the tenant data 120 may be stored in one or more data formats (or, simply, formats). For example, subscription records may be stored in a particular format, and consumption records may be stored in another format. As used herein, formats may include data types, variable types, protocols (e.g., protocols for accessing, storing, and/or transmitting data), programming languages, scripting languages, data value parameters (e.g., date formats, string lengths), endpoint locations and/or types, schemas, and/or the like.

In some embodiments, the tenant data 120 may be stored in one or more monolithic databases and in one or more custom field databases. As stated above, the tenant data 120 may be stored in different records, e.g., a subscription record, a consumption record, a billing record, etc. Each record may be managed by a particular record object, e.g., a subscription record object, a usage record object, a billing record object, etc. Each record object may manage a number of global fields that are common to all of the tenants. For example, the global fields for a subscription record for each and every tenant may include record ID, a username, a subscription identifier, etc. The global fields may be stored in the monolithic database. Notably, different tenants may require different additional fields to store information for different record objects. For example, a first tenant may require two custom fields for a subscription record and one custom field for a consumption record. Another tenant may require three custom fields for a subscription record and four custom fields for a consumption record. Data for these custom fields can be stored in a custom field database for each record for each tenant.

The monolithic and custom field databases of the multi-tenant system 102 may manage (e.g., create, read, update, delete) tenant data 120 using different formats, different protocols, etc. A monolithic application will control data storage in the monolithic database. A custom field service (microservice) will control data storage in the custom field database. It will be appreciated that as used herein, a "service" may be single service and/or a set of services (e.g., a cluster of services).

The data network (or, communication network) 104 may represent one or more computer networks (e.g., LAN, WAN, or the like) or other transmission mediums. The data network 104 may provide communication between the systems, engines, datastores, components, and/or devices described herein. In some embodiments, the data network 104 includes one or more computing devices, routers, cables, buses, and/or other network topologies (e.g., mesh, and the like). In some embodiments, the data network 104 may be wired and/or wireless. In various embodiments, the data network 104 may include the Internet, one or more wide area networks (WANs) or local area networks (LANs), one or more networks that may be public, private, IP-based, non-IP based, and so forth.

Figure 2A:
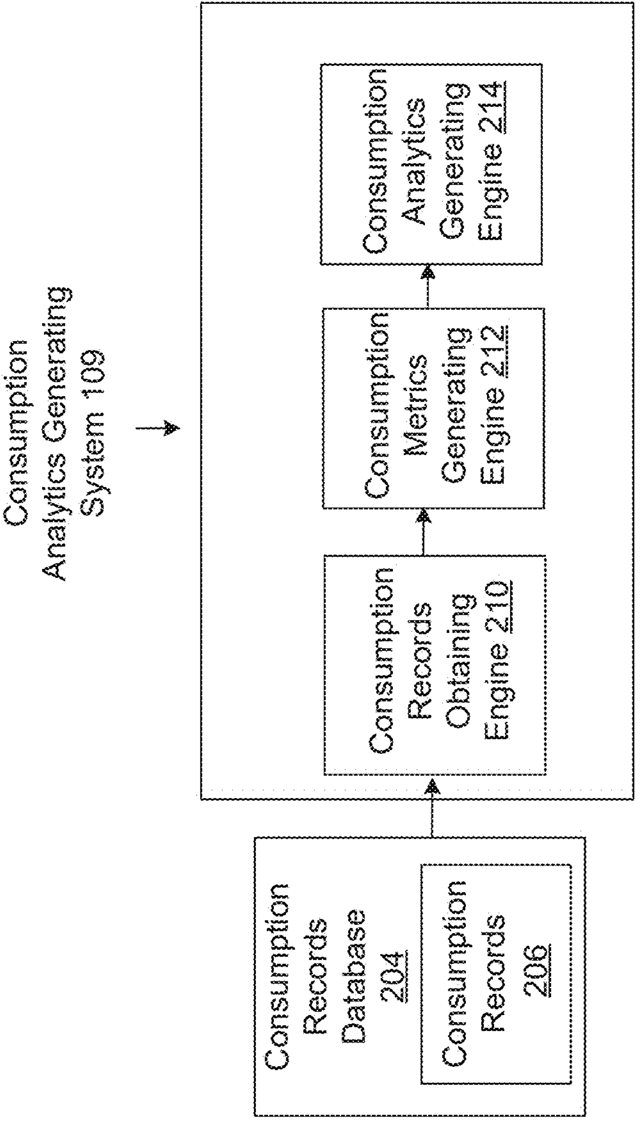
FIG. 2A is a block diagram illustrating details of a consumption analytics generating system, in accordance with some embodiments of the present invention.

FIG. 2A is a diagram illustrating details of the consumption analytics generating system 109, in accordance with some embodiments of the present invention. The consumption analytics generating system 109 may include a consumption records obtaining engine 210, a consumption metrics generating engine 212, and a consumption analytics generating engine 214. The consumption analytics generating system 109 may include one or more database systems, services, and/or microservices. Although the foregoing describes the consumption records obtaining engine 210, the consumption metrics generating engine 212, and the consumption analytics generating engine 214 separately for ease of understanding, the invention is not to be construed as limited to such. In some embodiments, any of the aforementioned engines may be integrated. In some embodiments, additional engines may be implemented.

Figure 2B:
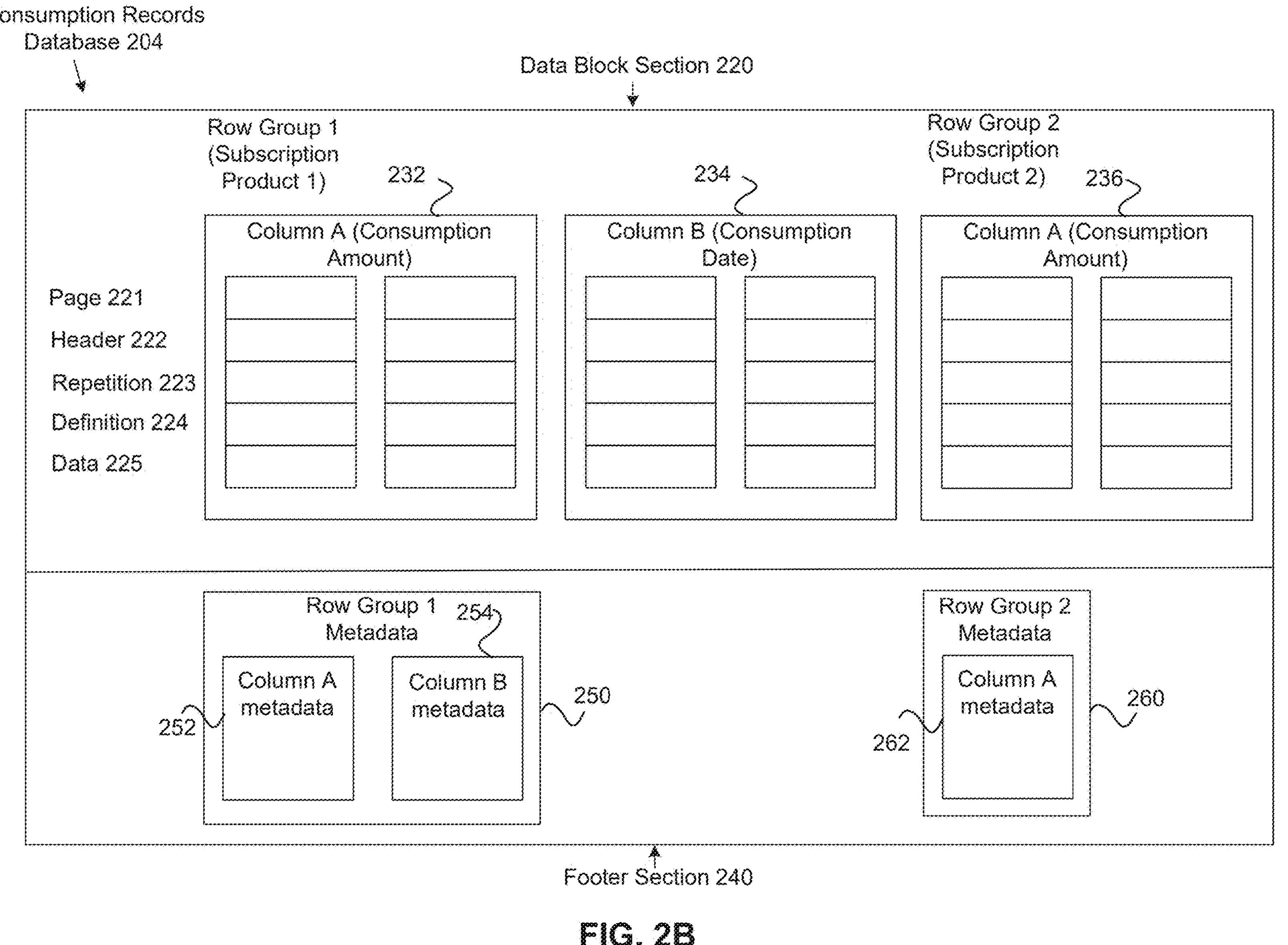
FIG. 2B is a diagram illustrating an example of a consumption records database to store consumption records, in accordance with some embodiments of the present invention.
Figure 3A:
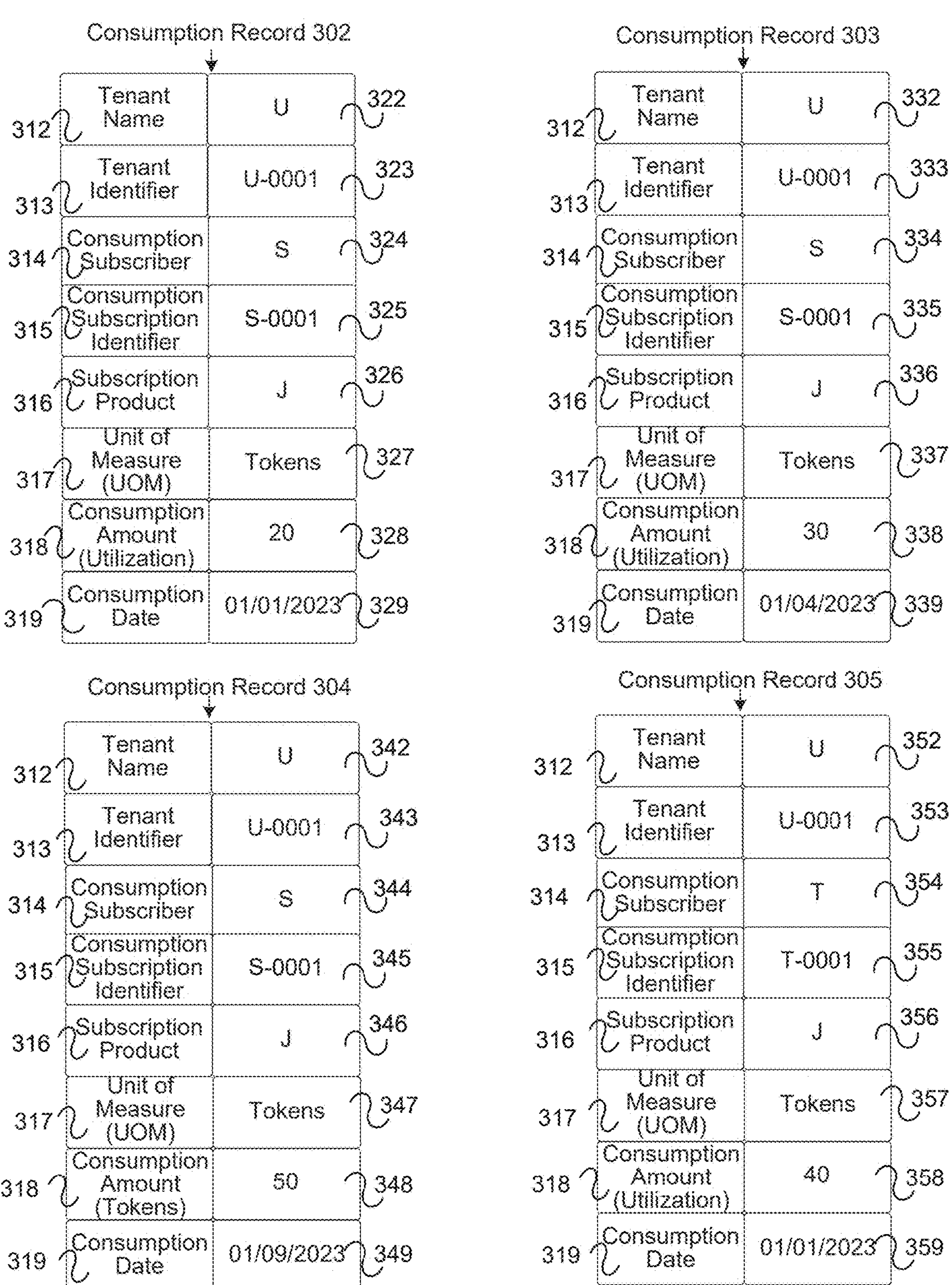
FIGS. 3A-3B are diagrams illustrating examples of consumption records, in accordance with some embodiments of the present invention.
Figure 3B:
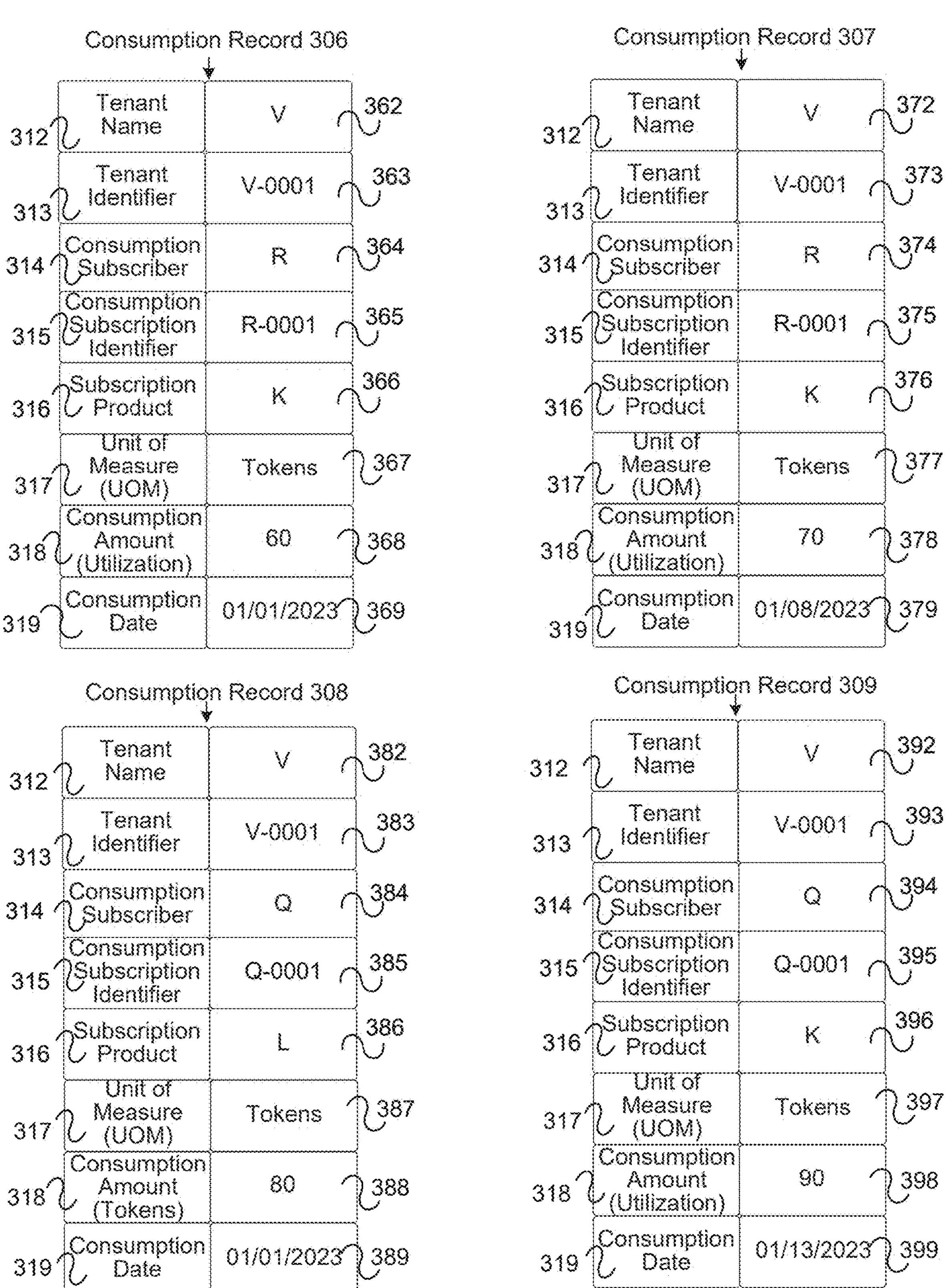

The consumption records obtaining engine 210 includes hardware, software and/or firmware configured to obtain one or more consumption records 206, or relevant subsets of consumption event attributes or consumption event attribute values from the consumption records 206. In some embodiments, the consumption records obtaining engine 210 may be configured to obtain the consumption records 206 via one or more Application Programming Interfaces (APIs). Examples of the consumption records 206 are illustrated in FIGS. 3A and 3B. In this disclosure, consumption records 206 may refer to an entirety or only a relevant portion of consumption event attributes and/or consumption event attribute values (e.g., one or more columns or rows corresponding to consumption event attributes). The consumption records 206 may be stored in a consumption records database 204, which may include a structured system. In some embodiments, the consumption records database 204 may constitute part of the datastores 114. An example implementation of the consumption records database 204 is illustrated in FIG. 2B.

In some embodiments, the consumption records obtaining engine 210 may efficiently retrieve relevant subsets of the consumption records 206 for metrics and/or analytics generating. Efficient retrieval may be facilitated because certain consumption event attributes of the consumption records 206 may be mapped to specific locations (e.g., columns or rows) of the consumption records database 204. In other words, to retrieve relevant subsets, only specific locations of the consumption records database 204 need to be accessed, rather than the entire consumption records database 204.

In some embodiments, as will be further illustrated in FIG. 4, the consumption records database 204 may be organized in a columnar format or a hybrid format, and/or based on certain consumption event attributes. In some examples, a first consumption event attribute value (e.g., subscription product or subscriber) may be a basis for which the consumption records 206 are separated or mapped into different row groups. That is, consumption records 206 pertaining to different subscription products or different subscribers may be mapped to different row groups. Within each row group, second consumption event attribute values (e.g., consumption amount and/or consumption date) may be populated within particular columns. Thus, the consumption records obtaining engine 210 may retrieve relevant second consumption event attribute values from the particular columns of one or more given row groups. This avoids accessing of the entire consumption records database 204.

In some embodiments, during a preprocessing phase, the consumption records obtaining engine 210 may obtain first consumption records for a first one of a plurality of different time windows (e.g., a first month when the time windows are defined on a monthly basis). The first consumption records comprise first consumption event attributes and first consumption event attribute values. The first consumption records may be partitioned into first partitions based on a first subset of the first consumption event attribute values (e.g., values corresponding to tenant or tenant identifier).

In some embodiments, during the preprocessing phase, the consumption records obtaining engine 210 may obtain second consumption records for a second one of a plurality of different time windows (e.g., a second month when the time windows are defined on a monthly basis). The first consumption records comprise second consumption event attributes (which may be same or partially in common with the first consumption event attributes) and second consumption event attribute values. The second consumption records may be partitioned into second partitions based on a second subset of the second consumption event attribute values (e.g., values corresponding to tenant or tenant identifier). In some embodiments, the first partitions may be the same as the second partitions. That is, a first consumption record having a particular value of a tenant and a second consumption record also having the particular value of the tenant may be partitioned into same partition spaces.

The consumption metrics generating engine 212 includes hardware, software and/or firmware configured to generate one or more consumption metrics for a particular tenant. In some embodiments, the consumption metrics may be stored in, imported to, or otherwise included within one or more consumption datasets, as illustrated in FIGS. 5A-5D. In some embodiments, the consumption metrics may be generated based on certain consumption event attributes such as subscriber or subscription product. In some embodiments, the consumption metrics may result from aggregating consumption amounts across consumption records 206 that satisfy a trigger condition. In some embodiments, the trigger condition may be a common consumption event attribute value corresponding to a particular consumption event attribute (e.g., subscriber or subscription product). In other words, the consumption amounts may be aggregated across any consumption records 206 that have a common consumption event attribute value. In some embodiments, the consumption amounts may be aggregated over various time windows, such as a day, a week, or a month. In some embodiments, the consumption amounts may be aggregated over a rolling time window. In other embodiments, the consumption metrics may result from aggregating a different consumption event attribute value (e.g., different from the common consumption event attribute value).

As one example, the consumption amounts may be aggregated over a fixed time window such as between 12:00 AM of Jan. 1, 2023 until 12:00 AM of Jan. 2, 2023, between 12:00 AM of Jan. 1, 2023 until 12:00 AM of Jan. 7, 2023, or between 12:00 AM of Jan. 1, 2023 until 12:00 AM of Jan. 31, 2023. As another example, assume that the rolling time window is one day. Under that assumption, on Jan. 2, 2023 at 2:00 PM, the consumption amounts may be aggregated for a time period between Jan. 1, 2023 at 2:00 PM and Jan. 2, 2023 at 2:00 PM. On Jan. 2, 2023 at 3:00 PM, the consumption amounts may be aggregated for a time period between Jan. 1, 2023 at 3:00 PM and Jan. 2, 2023 at 3:00 PM. Other implementations are also contemplated, in which the consumption amounts are aggregated across other consumption event attributes.

In some embodiments, generating the consumption metrics may occur at certain time periods, which may be iterative time periods. These time periods may include certain times of a day, week, or month. Time periods may not necessarily be periodic. In some embodiments, the time periods may be dynamically configurable based on one or more trigger conditions, such as upon a number of newly obtained consumption records or consumption events having occurred. In some embodiments, generating the consumption metrics may be triggered based on a number of newly obtained consumption records for which consumption metrics have not yet been generated. For example, if a number of newly obtained consumption records exceeds a threshold number, then the consumption metrics generating engine 212 may be triggered to generate the consumption metrics for the newly obtained consumption records. In some embodiments, generating the consumption metrics may occur upon a trigger condition, e.g., periodically, based on calendar date and/or time, upon identifying certain consumption events or other events occurring, upon identifying a number of consumption events, upon manual request, or based on other factors, etc. A frequency of generating the consumption metrics may be of equal frequency or a higher frequency compared to a duration spanned by the generated analytics. For example, if the generated analytics is over a one-year period, then the frequency of generating the consumption metrics may be at least once a year.

In a specific example, a frequency of generating the consumption metrics may be dynamically configured based on a number of the consumption records 206 for which consumption analytics have not yet been generated, and/or a frequency or rate at which the consumption events occur. If consumption events occur at a rate of one billion consumption events per month, then generating of the consumption metrics may occur daily in order to avoid potentially overheating computing components. If consumption events occur at a rate of one hundred consumption events per month, then generating of the consumption metrics may occur quarterly (every three months) or biannually (every six months).

In some embodiments, the consumption metrics generating engine 212 may generate, in each of the first partitions, for the first one of the plurality of different time windows, one or more first consumption datasets based on the first consumption records, the one or more first consumption datasets comprising first aggregated consumption metrics for the first one of the plurality of different time windows.

In some embodiments, the consumption metrics generating engine 212 may generate, in each of the second partitions, for the second one of the plurality of different time windows, one or more second consumption datasets based on the second consumption records, the one or more second consumption datasets comprising second aggregated consumption metrics for the second one of the plurality of different time windows.

The consumption analytics generating engine 214 includes hardware, software and/or firmware configured to generate one or more consumption analytics. In some embodiments, the consumption analytics may include scores indicative of an amount and/or a rate of change of the consumption analytics over time for different subscribers and/or for different subscription products. In some embodiments, the one or more scores may be generated based on a Mann-Kendall test or other similar test. In some embodiments, the one or more scores may be generated based on a degree of monotonicity over time of the consumption amount. In some embodiments, each score may represent a growth score, which may be indicative of a probability of a continued increase or a future increase in the consumption amount for a particular subscriber or a particular product. In some embodiments, the one or more scores may represent a risk score, which may be indicative of a probability of a continued decrease or a future decrease in the consumption amount for a particular subscriber or a particular product. In some embodiments, the one or more scores may be normalized for the particular tenant. For example, a highest score for the particular tenant, compared to other scores for the particular tenant, may be 100. Other scores for the particular tenant, which may correspond to different subscribers or different products, may be normalized based on the highest score being 100.

In some embodiments, the consumption analytics generating engine 214 may generate representations, such as textual, graphical, and/or pictorial representations of the consumption metrics. The generated representations may include or indicate trends over time of the consumption metrics. For example, the generated representations may include a comparison of a consumption metric over a most recent one-week period compared to a previous one-week period. In other embodiments, the consumption analytics generating engine 214 may present its results in a dashboard. Examples of outputs of the analysis are illustrated in FIGS. 6-12.

In some embodiments, during an analytics generation phase, the consumption analytics generating engine 214 may generate consumption analytics results from an evaluation of a trend across the first aggregated consumption metrics for the first one of the plurality of different time windows and the second aggregated consumption metrics for the second one of the plurality of different time windows; and output the consumption analytics results.

FIG. 2B is a diagram illustrating details of the consumption records database 204, in accordance with some embodiments of the present invention. FIG. 2B merely illustrates one example of a consumption records database. Other organizations and/or types of consumption records databases are also contemplated. Other formats and manners of storage of the consumption records 206 are also contemplated. In some embodiments, the consumption records database 204 may store the consumption records 206 in a structured format such as a columnar or hybrid format. A hybrid format may refer to a format that includes one or more row representation (e.g., row groups) and one or more column representations. In some embodiments, the consumption records 206 may be at least partially compressed and/or encoded at least partially prior to being stored in the consumption records database 204. In some embodiments, the consumption records 206 may include or be embedded with metadata, or the consumption records database 204 may store metadata associated with the consumption records 206.

In some embodiments, the consumption records database 204 may include or be represented as multiple sections such as a data block section 220 that includes data corresponding to the consumption records 206 and a footer section 240 that includes associated metadata. In the example illustrated in FIG. 2B, the data block section 220 includes different row groups or blocks. In some embodiments, the different row groups may correspond to different subscription products of a same tenant or subtenant. The data block section 220 may include, within a particular row group, one or more columns. In the example shown in FIG. 2B, the data block section 220 may include a first column 232 labelled as "Column A" and a second column 234 labelled as "Column B" within a first row group and a first column 236 within a second row group. Each column may include any or all of a page 221 identifying a relative location within the consumption records 206, a header 222 identifying a name and/or a path of the consumption records 206, a repetition level 223 identifying or distinguishing between different repeated data entries (e.g., repeated consumption event attribute values), a definition level 224 that defines any optional fields (e.g., optional consumption event attributes), and data 225 which may include a consumption event attribute value. The repetition level 223 and the definition level 224 may provide for efficient storage and retrieval, by avoiding separate storage of any repeated data entries while still recording separate instances of the repeated data entries. In some embodiments, the data 225 in each column may correspond to a particular consumption event attribute value. In some examples, the data 225 corresponding to the first column 232 and the second column 234 may include the consumption quantity 232 and the consumption date 234, respectively. This mapping of a particular consumption event attribute value to a particular column also facilitates a fast response time of retrieval because only one or more particular columns that are relevant to a query need to be accessed, rather than an entirety of the consumption records database 204. For example, if a query pertains to a consumption quantity over a period of time of subscription product 1, then the first column 232 and the second column 234 are accessed, without accessing other columns or row groups that are irrelevant to the query.

The footer section 240 may include metadata of the consumption records 206. The metadata may include metadata 250, 260 for each row group, and/or metadata 252, 254, 262 for each column. In some embodiments, metadata may indicate a schema of the consumption records 206, types of the data (e.g., integer, string, Boolean, float, double, array), any encoding within the consumption records 206, and/or any offsets that indicate a mapping of pages within consumption records 206 to particular rows. The metadata may include, as nonlimiting examples, metrics such as minimum values or maximum values. The presence of metadata further improves efficiency of data retrieval because, from the metadata, the consumption records obtaining engine 210 may determine certain columns or row groups as relevant or irrelevant. Thus, the consumption records obtaining engine 210 may access fewer locations (e.g., columns or row groups) within the consumption records database 204 in order to retrieve relevant consumption records data.

Storing in a columnar or hybrid format has technical benefits of higher compression ratios which reduces storage requirements. Another technical benefit includes skipping of irrelevant columns. Another technical benefit includes flexible addition of new columns or changes to existing columns without disrupting existing data. Another technical benefit includes efficient encoding of data when storing data within the consumption records database 204.

FIGS. 3A and 3B are diagrams illustrating example consumption records 302, 303, 304, 305, 306, 307, 308, and 309. In FIG. 3A, example consumption records 302, 303, 304, 305, 306, 307, 308, and 309 may be implemented as the consumption records 206 of FIG. 2. The consumption record 302 may include consumption event attributes 312, 313, 314, 315, 316, 317, 318, and 319 corresponding to tenant name, tenant identifier, consumption subscriber, consumption subscription identifier, subscription product, unit of measure (UOM) of consumption, consumption amount, and a consumption date, respectively.

In the consumption record 302, the UOM 317 is measured by a number of tokens. In some embodiments, each consumption amount may be measured by one or more meters, and different meters may measure different units of consumption. The consumption event attributes 312, 313, 314, 315, 316, 317, 318, and 319 may correspond to respective consumption event attribute values 322, 323, 324, 325, 326, 327, 328, and 329. The consumption event attributes and consumption event attribute values are merely exemplary, and consumption records may have fewer, more, or different consumption event attributes and consumption event attribute values. Other examples of consumption event attributes may include industry sector, a method by which subscription resources were requested, a country in which the subscription resources were consumed, and/or a consumption channel.

The consumption record 303 has same consumption event attributes as the consumption record 302. The consumption event attributes 312, 313, 314, 315, 316, 317, 318, and 319 of the consumption record 303 may correspond to respective consumption event attribute values 332, 333, 334, 335, 336, 337, 338, and 339. The consumption record 304 has same consumption event attributes as the consumption record 302. The consumption event attributes 312, 313, 314, 315, 316, 317, 318, and 319 of the consumption record 304 may correspond to respective consumption event attribute values 342, 343, 344, 345, 346, 347, 348, and 349. The consumption record 305 has same consumption event attributes as the consumption record 302. The consumption event attributes 312, 313, 314, 315, 316, 317, 318, and 319 of the consumption record 305 may correspond to respective consumption event attribute values 352, 353, 354, 355, 356, 357, 358, and 359.

In FIG. 3B, the consumption record 306 has same consumption event attributes as the consumption record 302. The consumption event attributes 312, 313, 314, 315, 316, 317, 318, and 319 of the consumption record 306 may correspond to respective consumption event attribute values 362, 363, 364, 365, 366, 367, 368, and 369. The consumption record 307 has same consumption event attributes as the consumption record 302. The consumption event attributes 312, 313, 314, 315, 316, 317, 318, and 319 of the consumption record 307 may correspond to respective consumption event attribute values 372, 373, 374, 375, 376, 377, 378, and 379. The consumption record 308 has same consumption event attributes as the consumption record 302. The consumption event attributes 312, 313, 314, 315, 316, 317, 318, and 319 of the consumption record 308 may correspond to respective consumption event attribute values 382, 383, 384, 385, 386, 387, 388, and 389. The consumption record 309 has same consumption event attributes as the consumption record 302. The consumption event attributes 312, 313, 314, 315, 316, 317, 318, and 319 of the consumption record 309 may correspond to respective consumption event attribute values 392, 393, 394, 395, 396, 397, 398, and 399. As will be illustrated in FIG. 4, the consumption records 206 may be partitioned based on criteria such as consumption event attribute values corresponding to the consumption event attributes of the tenant name 312 or the tenant identifier 313, and/or the consumption date 319.

FIG. 4 is a diagram illustrating an example of how the consumption records 206 are partitioned. In some embodiments, partitioning includes security partitioning to prevent certain data transmission or data flow among different partitions. Partitioning may include physical and/or logical partitions within the consumption records database 204 and/or within memory components or other components. In some embodiments, partitioning encompasses routing each of the consumption records 206, or portions thereof, to a particular storage partition. In some embodiments, storage partitions may include directories and/or folders within the datastores 114. In some embodiments, the storage partitions include tenant level partitions 410 and 430, each of which is configured to store consumption records of a particular tenant or subtenant. In some embodiments, the storage partitions may, additionally or alternatively, include temporal level partitions 412, 414, 422, 424, 426, 428, 432, 434, 442, 444, 446, and 448, each of which is configured to store consumption records having a particular temporal attribute (e.g., a day and/or a time period). In FIG. 4, the temporal level partitions 412, 414, 422, 424, 426, 428, 432, 434, 442, 444, 446, and 448 may be sub-directories that are hierarchically organized under one of the tenant level directories 410 and 430. In the example illustrated in FIG. 4, the tenant level directory 410 stores consumption records corresponding to a tenant identifier attribute value/field U-0001, and the tenant level directory 430 stores consumption records corresponding to the tenant identifier attribute value/field V-0001. Thus, any consumption records (e.g., the consumption records 302, 303, 304, and 305) that have a tenant identifier satisfying U-0001 are routed into the tenant level partition 410. Any consumption records (e.g., the consumption records 306, 307, 308, and 309) that have a tenant identifier satisfying V-0001 are routed into the tenant level partition 430.

Partitioning based on tenant identifier and temporal attributes facilitates efficient retrieval of relevant consumption for generating of consumption metrics and/or consumption analytics. Frequently, generating of consumption metrics and/or consumption analytics may be specific to tenant identifiers and/or time periods. To obtain the relevant consumption records for a particular tenant, only a particular tenant level directory corresponding to that tenant identifier being queried needs to be accessed, instead of accessing the entire datastore 114 or the entire consumption records database 204. Moreover, such partitioning also ensures security by preventing data from being shared among different tenants. Consumption records corresponding to different tenants may also have different metadata, such as security settings (e.g., access control restrictions and/or dissemination restrictions). By segregating the consumption records of different tenants, these tenant-specific security settings may be enforced in each of the different storage partitions. In other embodiments, partitioning may additionally or alternatively be based on other criteria such as a schema of the consumption records. A schema may refer to a subset or all of the consumption event attributes illustrated in FIG. 3A and FIG. 3B.

FIGS. 5A-5D are diagrams illustrating an example of generating consumption metrics, implemented for example by the consumption metrics generating engine 212. The consumption metrics may be stored or represented within consumption datasets. FIGS. 5A-5D merely illustrate non-limiting examples of consumption metrics and consumption datasets. Other formats or types of consumption metrics and consumption datasets are also contemplated. In some embodiments, consumption datasets 502, 512, 522, and 532 illustrated in FIGS. 5A-5D may include one or more files and be stored in a particular storage partition. For example, the consumption datasets 502 and 512, which belong to tenant U, may be partitioned separately from the consumption datasets 522 and 532, which belong to tenant V. In some embodiments, the consumption datasets 502, 512, 522, and 532 may include a structured format such as a columnar or hybrid format, similar or analogous to that illustrated in FIG. 2B. A hybrid format may refer to a format that includes both row representation (e.g., row groups) and column representations. The consumption datasets 502 and 512 may be stored in separate storage partitions from the consumption datasets 522 and 532 because the consumption datasets 502 and 512 pertain to tenant U while the consumption datasets 502 and 512 pertain to tenant V.

In some embodiments, in FIG. 5A, the consumption dataset 502 includes aggregated consumption metrics of tenant U, across any of the consumption records 302-305 illustrated in FIG. 3A that satisfy a trigger condition. Here, the trigger condition may include a common consumption subscriber identifier value satisfying a particular value (e.g., consumption subscriber identifier value S-0001 for one set of aggregated consumption metrics and consumption subscriber identifier value T-0001 for another set of aggregated consumption metrics). In some embodiments, the trigger condition also includes a common subscription product value satisfying a particular value (e.g., subscription product value J). For example, the consumption dataset 502 includes aggregated consumption metrics for any consumption records corresponding to subscriber S (e.g., the consumption records 302, 303, and 304). Separately, the consumption dataset 502 includes aggregated consumption metrics for any consumption records corresponding to subscriber T (e.g., the consumption record 305). Here, the aggregated consumption metrics include consumption metrics aggregated over different time periods, such as daily consumption metrics during different days, weekly consumption metrics during different weekly periods, and/or monthly consumption metrics during different months. Other embodiments are also possible, in which consumption metrics may be aggregated over different time periods such as any 7-day period, any 30 or 31-day period, or any rolling period.

As illustrated in FIG. 5A, for consumption subscriber S, the aggregated daily consumption metrics include a consumption amount of 20 on Jan. 1, 2023 from the consumption record 302, a consumption amount of 30 on Jan. 4, 2023 from the consumption record 303, and a consumption amount of 50 on Jan. 9, 2023. The aggregated weekly consumption metrics include a consumption amount of 50 during a weekly period from Jan. 1, 2023 and Jan. 7, 2023, obtained by summing the consumption amounts in the consumption records 302 and 303. The aggregated weekly consumption metrics include a consumption amount of 50 during a weekly period from Jan. 8, 2023 and Jan. 14, 2023, obtained from the consumption record 304 which is the only consumption record 304 during that week. The aggregated monthly consumption metrics include a consumption amount of 100 from Jan. 1, 2023 to Jan. 31, 2023 (January 2023), obtained by summing the consumption amounts in the consumption records 302, 303, and 304 which fall within the monthly period.

For consumption subscriber T, the aggregated daily consumption metrics include a consumption amount of 60 on Jan. 1, 2023, obtained from the consumption record 305. The aggregated weekly consumption metrics include a consumption amount of 50 during a weekly period from Jan. 1, 2023 and Jan. 7, 2023, obtained from the consumption record 305 which is the only consumption record for consumption subscriber T. The aggregated monthly consumption metrics include a consumption amount of 50 during a monthly period from Jan. 1, 2023 to Jan. 31, 2023 (January 2023), obtained from the consumption record 305.

Figure 5B:
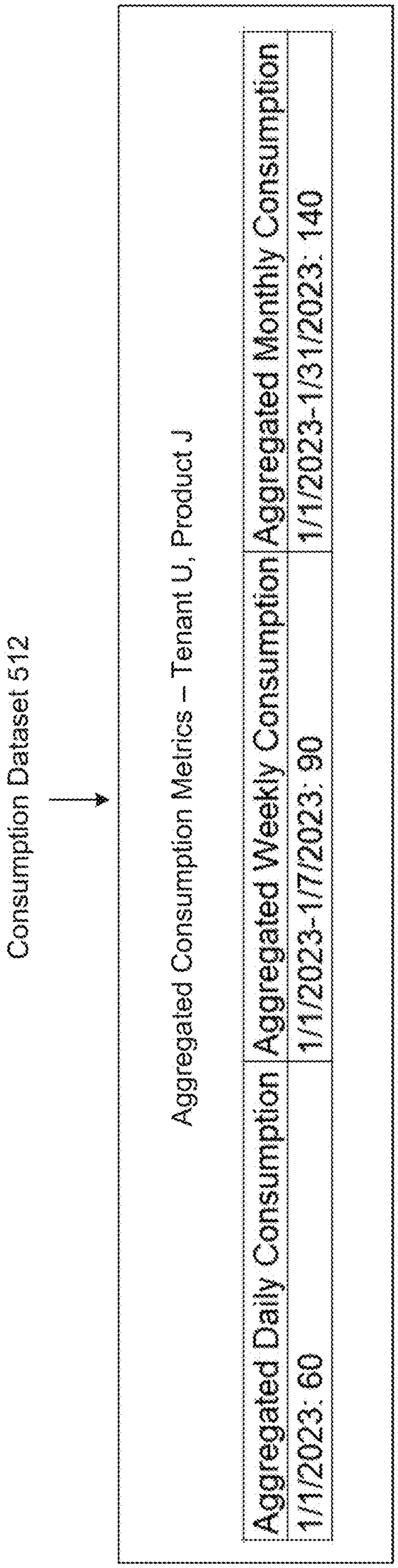

FIG. 5B illustrates the consumption dataset 512, which includes consumption metrics that are alternatively aggregated for any of the consumption records for the tenant U that have a common subscription product value (e.g., J), regardless of consumption subscriber. The aggregated daily consumption metrics include a consumption amount of 60 on Jan. 1, 2023, obtained by summing the consumption amounts in the consumption records 302 and 305 which both have a consumption date of Jan. 1, 2023. The aggregated weekly consumption metrics include a consumption amount of 90 during a weekly period between Jan. 1, 2023 and Jan. 7, 2023, obtained by summing the consumption amounts in the consumption records 302, 305, and 303. The aggregated daily consumption metrics include a consumption amount of 140 during a monthly period from Jan. 1, 2023 and Jan. 31, 2023, obtained by summing the consumption amounts in the consumption records 302, 303, 304, and 305.

FIG. 5C illustrates the consumption dataset 522, which includes consumption metrics that are aggregated for any of the consumption records for the tenant V (e.g., the consumption records 306, 307, 308, and 309 as illustrated in FIG. 3B) that have a common consumption subscriber value (e.g., consumption subscriber value R for one set of aggregated consumption metrics and consumption subscriber value Q for another set of aggregated consumption metrics).

As illustrated in FIG. 5C, for consumption subscriber R, the aggregated daily consumption metrics include a consumption amount of 60 on Jan. 1, 2023 from the consumption record 306, and a consumption amount of 70 on Jan. 8, 2023 from the consumption record 307. The aggregated weekly consumption metrics include a consumption amount of 60 during a weekly period from Jan. 1, 2023 and Jan. 7, 2023, and a consumption amount of 70 during a weekly period from Jan. 8, 2023 and Jan. 14, 2023. The aggregated monthly consumption metrics include a consumption amount of 130 during a monthly period from Jan. 1, 2023 and Jan. 31, 2023, obtained by summing the consumption amounts in the consumption records 306 and 307.

For consumption subscriber Q, the aggregated daily consumption metrics include a consumption amount of 80 on Jan. 1, 2023 from the consumption record 308, and a consumption amount of 90 on Jan. 13, 2023 from the consumption record 309. The aggregated weekly consumption metrics include a consumption amount of 80 during a weekly period from Jan. 1, 2023 and Jan. 7, 2023, and a consumption amount of 90 during a weekly period from Jan. 8, 2023 and Jan. 14, 2023. The aggregated monthly consumption metrics include a consumption amount of 170 during a monthly period from Jan. 1, 2023 and Jan. 31, 2023, obtained by summing the consumption amounts in the consumption records 308 and 309.

FIG. 5D illustrates the consumption dataset 532, which includes consumption metrics that are alternatively aggregated for any of the consumption records for the tenant V that have a common subscription product value (e.g., subscription product value K for one set of aggregated consumption metrics and subscription product value L for another set of aggregated consumption metrics), regardless of consumption subscriber. For subscription product value K, the aggregated daily consumption metrics include a consumption amount of 60 on Jan. 1, 2023, obtained from the consumption record 306, a consumption amount of 70 on Jan. 8, 2023, obtained from the consumption record 307, and a consumption amount of 90 on Jan. 13, 2023, obtained from the consumption record 309. The aggregated weekly consumption metrics include a consumption amount of 60 during a weekly period between Jan. 1, 2023 and Jan. 7, 2023. The aggregated weekly consumption metrics include a consumption amount of 160 during a weekly period between Jan. 8, 2023 and Jan. 15, 2023, obtained by summing the consumption amounts in the consumption records 307 and 309. The aggregated monthly consumption metrics include a consumption amount of 220 during a monthly period between Jan. 1, 2023 and Jan. 31, 2023, obtained by summing the consumption amounts in the consumption records 306, 307 and 309.

For subscription product value L, there is only one consumption record 308, which is used to determine the aggregated daily consumption metrics on Jan. 1, 2023, the aggregated weekly consumption metrics between Jan. 1, 2023 and Jan. 7, 2023, and the aggregated monthly consumption metrics between Jan. 1, 2023 and Jan. 31, 2023. Because the consumption record 308 is the only consumption record during these times or time periods, the aggregated consumption amount is 80 during all these times or time periods.

Generating aggregated metrics may increase an efficiency of generating consumption analytics, because the aggregated metrics may be directly retrieved without having to compute them. In addition, because of the structured format of the consumption datasets 502, 512, 522, and/or 532, relevant aggregated metrics may be efficiently retrieved from specific columns and/or row groups, instead of from an entirely of the consumption datasets 502, 512, 522, and/or 532 the consumption records database 204. This further increases efficiency of generating consumption analytics.

FIGS. 6-12 are diagrams illustrating example outputs of consumption analytics, as generated, for example, by the consumption analytics generating engine 214. In some embodiments, the consumption analytics may be generated in response to queries. Queries may include a specific request for specific consumption data or simply accessing a page within a graphical user interface without a specific request. In FIG. 6, the consumption analytics generating engine 214 retrieves relevant portions of the consumption records 206 or from any of the consumption datasets 502, 512, 522, or 532, and generates one or more analytics results 602 which may be outputted on a display screen (e.g., as part of the tenant interfaces 110). In some embodiments, the analytics results 602 includes aggregated consumption amounts for different subscribers (e.g., corresponding to different consumption subscription identifiers 315) over a period of time (e.g., over a previous 12-month period). In some embodiments, additionally or alternatively, the analytics results 602 includes scores indicative of a degree of monotonicity of an increasing trend or a decreasing trend of the consumption amounts over time. For example, the analytics results 602 may be indicative of how aggregated daily consumption amounts, aggregated weekly consumption amounts, and/or aggregated monthly consumption amounts as illustrated in FIGS. 5A-5D vary over different days, weeks, and/or months. The scores may be determined, for example, based on a Mann-Kendall test. In some embodiments, in the event of missing values within the relevant portions, the consumption analytics generating engine 214 may normalize the relevant portions by filling in certain default values corresponding to the missing values. In some embodiments, the analytics results 602, such as the scores, may indicate a degree of health associated with a particular subscriber, or alternatively, a particular subscription product. In some embodiments, the scores are normalized based on a highest score being 100.

In some embodiments, the consumption analytics generating engine 214 may be configured to display a menu listing one or more applications or modules which may correspond to different customer names or subscribers, consumption amounts, or scores. The consumption analytics generating engine 214 may be configured to additionally display an application summary which summarizes aggregated consumption amounts and the scores. The application summary may be part of the menu listing or can be reached directly from the menu listing. The application summary may display a limited list of data (e.g., subscribers, consumption amounts, and/or scores) when the applications are in an unlaunched state. Each of the data may be selectable to launch an application, for example, upon selection of or hovering over the "View" button. Each application may correspond to, or be launched in, a separate dashboard to display a more detailed or granular view of the data. In this manner, the consumption analytics generating engine 214 may display a summarized view which includes a limited portion of data as well as a more detailed application view, which implements flexible display of information on different devices with different sizes of display screens. The limited portion of data may be displayed within a computing device having a smaller screen size, while the more detailed application view may be displayed within a computing device having a larger screen size.

Figure 7:
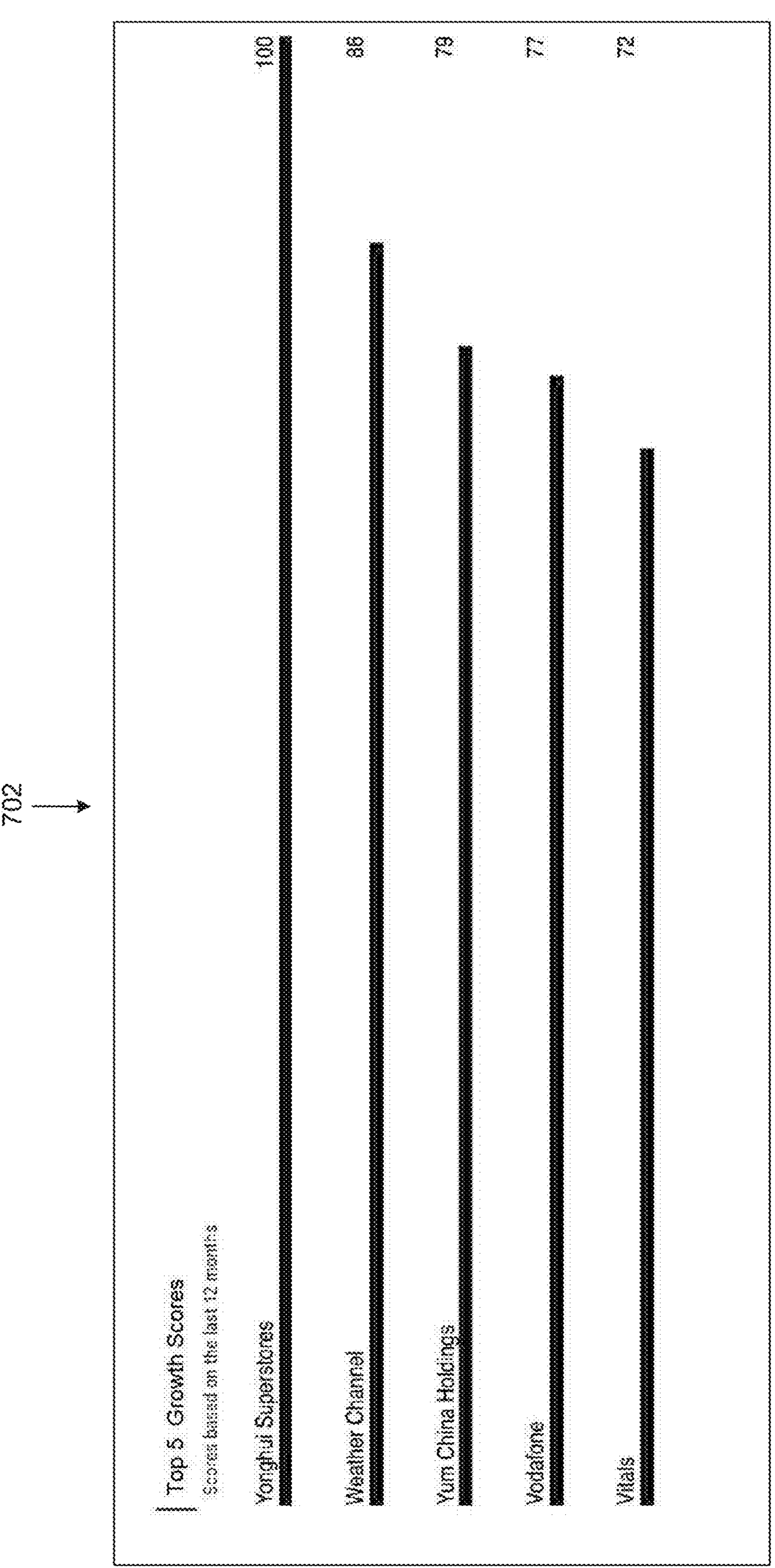

FIG. 7 is a diagram that illustrates the consumption analytics generating engine 214 generating one or more analytics results 702. Generating the analytics results 702 may include scoring different subscription products and/or different subscribers as well as ranking and/or classifying the scores. The analytics results 702 may include scores and rankings of different subscribers, based on highest positive scores. As alluded to in FIG. 6, the scores may be indicative of a degree of monotonicity of an increasing trend of the consumption amounts over time. The analytics results 702 may include a limited subset of subscribers, such as five subscribers, corresponding to highest scores. In some embodiments, any of the scores or rankings may be selectable, such that upon selection, additional details of the scores or rankings are launched in a separate application.

Figure 8:
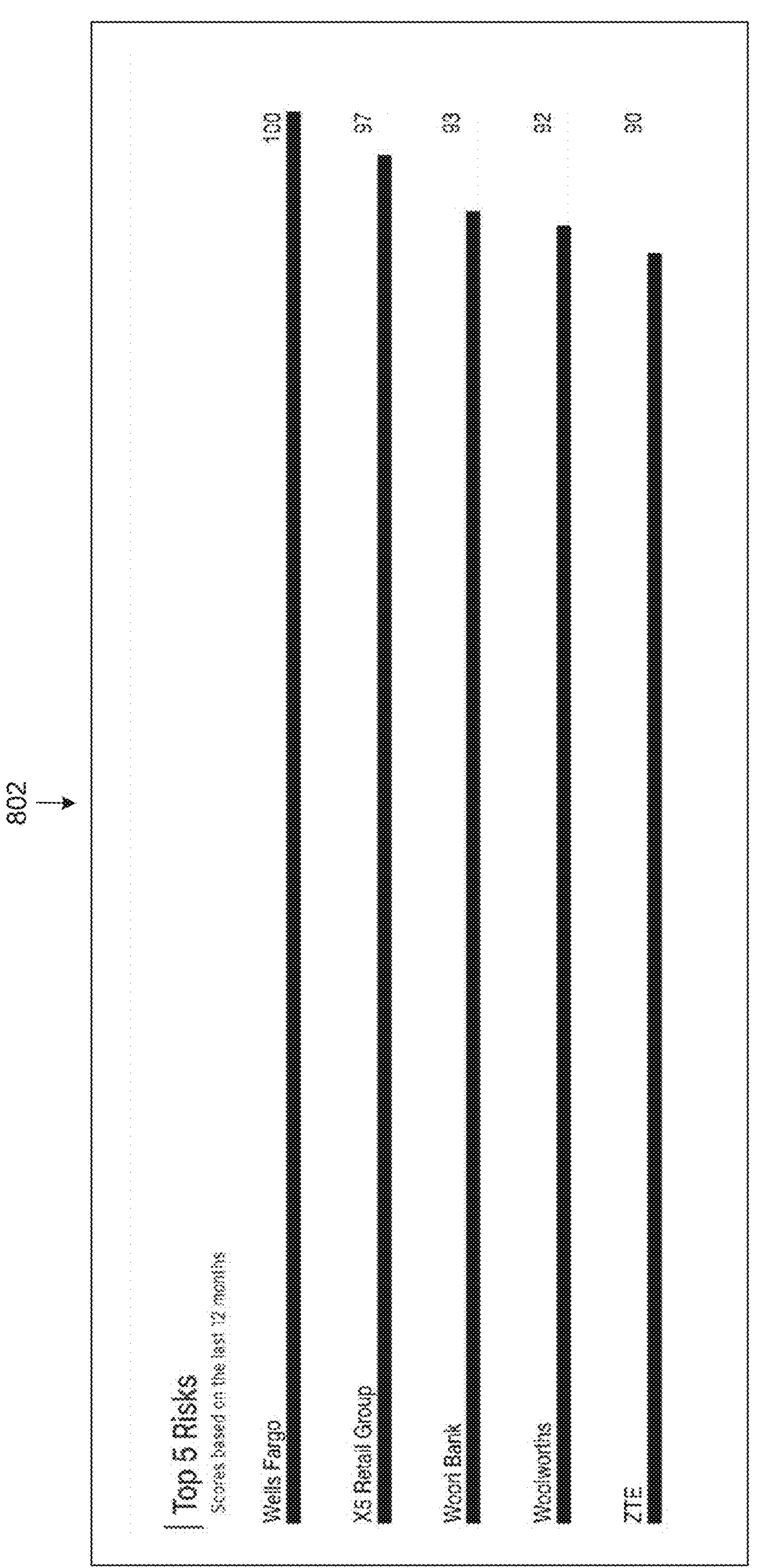

FIG. 8 is a diagram that illustrates the consumption analytics generating engine 214 generating one or more analytics results 802. The analytics results 802 may include scores and rankings of different subscribers, based on lowest scores. In some embodiments, all scores displayed within the analytics results 802 may be non-negative, even if the Mann-Kendall test outputs a negative score. In FIG. 8, the scores may be indicative of a degree of monotonicity of a decreasing trend of the consumption amounts over time. The analytics results 802 may include a limited subset of subscribers, such as five subscribers, corresponding to most negative scores. In some embodiments, any of the scores or rankings may be selectable, such that upon selection, additional details of the scores or rankings are launched in a separate application.

Figure 9:
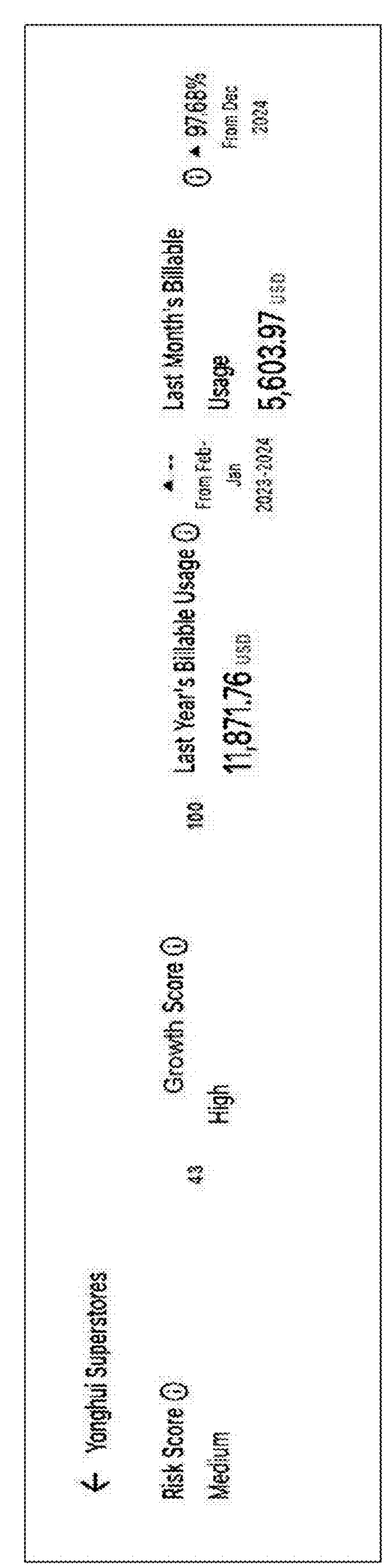

FIG. 9 is a diagram that illustrates the consumption analytics generating engine 214 generating one or more analytics results 902. The analytics results 902 may include, for a particular subscriber, a first score indicating a first probability of a decreased amount or rate of future consumption and a second score indicating a second probability of an increased amount or rate of future consumption. In some embodiments, the first score is not inversely correlated to the second score, and the first score may be computed independently using different metrics, comparisons, and/or algorithms from the computation of the second score. The analytics results 902 may include metrics such as a monthly consumption amount as of one year ago and a consumption amount of a most recent month. The analytics results 902 may include a difference between a consumption of a current time period (e.g., a current month) and a previous consumption amount. In some embodiments, any of the scores or metrics may be selectable, such that upon selection, additional details of the scores or metrics are launched in a separate application.

FIG. 10 is a diagram that illustrates the consumption analytics generating engine 214 generating one or more analytics results 1002. The analytics results 1002 may include trends and consumption amounts corresponding to different subscriptions and/or subscription products. The analytics results 1002 in FIG. 10 include a graphical depiction of consumption trends. In some embodiments, a graphical depiction may be selected to display a more detailed view or an alternative representation, such as a tabular and/or textual representation, of the consumption trends. Examples of more detailed views are illustrated in FIGS. 11 and 12.

Figure 11:
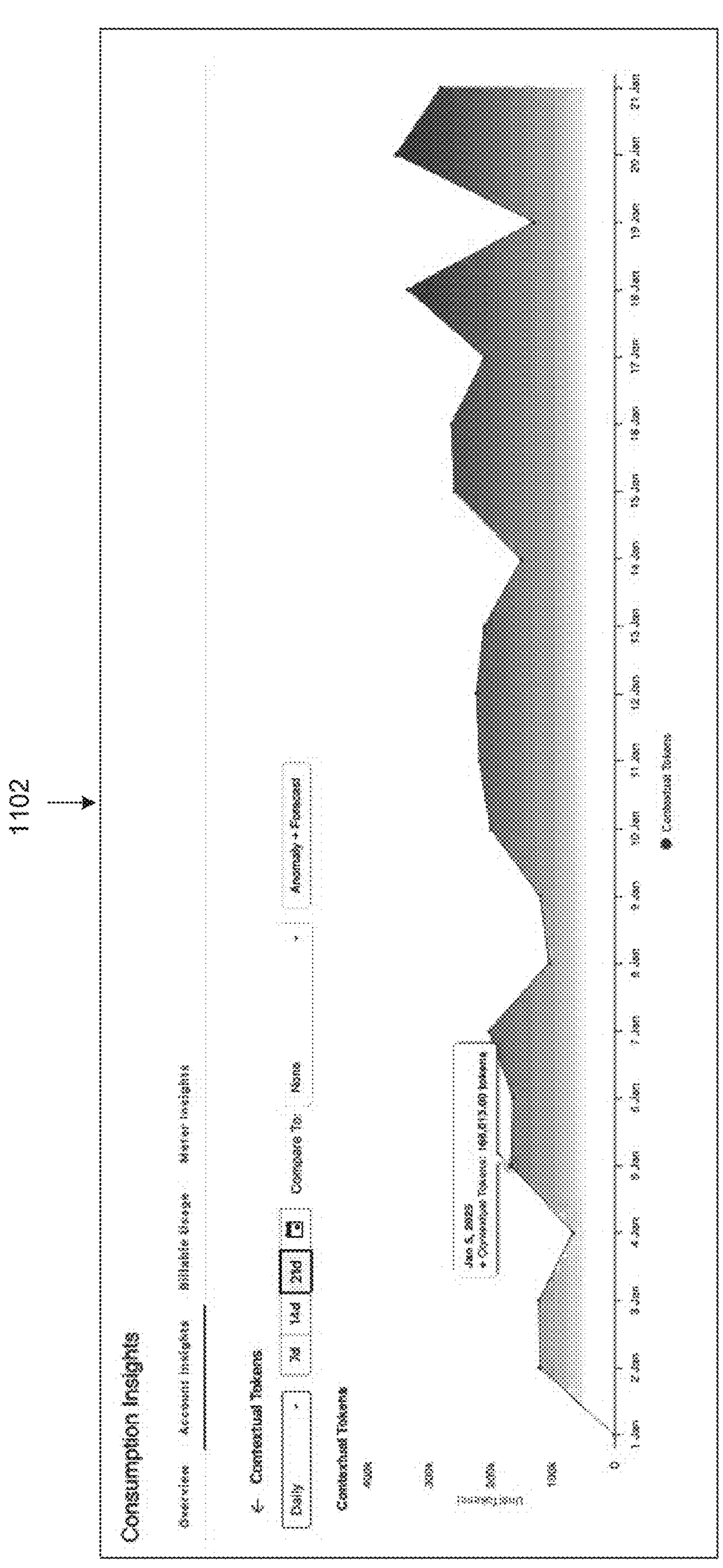

FIG. 11 is a diagram that illustrates the consumption analytics generating engine 214 generates one or more analytics results 1102. The analytics results 1102 may include trends and consumption amounts corresponding to different subscriptions and/or subscription products. The analytics results 1102 in FIG. 11 include a graphical depiction of consumption amounts of a particular subscription product, over a time period and having a given time scale (e.g., a level of granularity). As illustrated in FIG. 11, the time period and a time scale may be selectable. In FIG. 11, a time period of 21 days and a daily time scale has been selected. In addition, the analytics results 1102 may include anomaly detection and future predictions.

Figure 12:
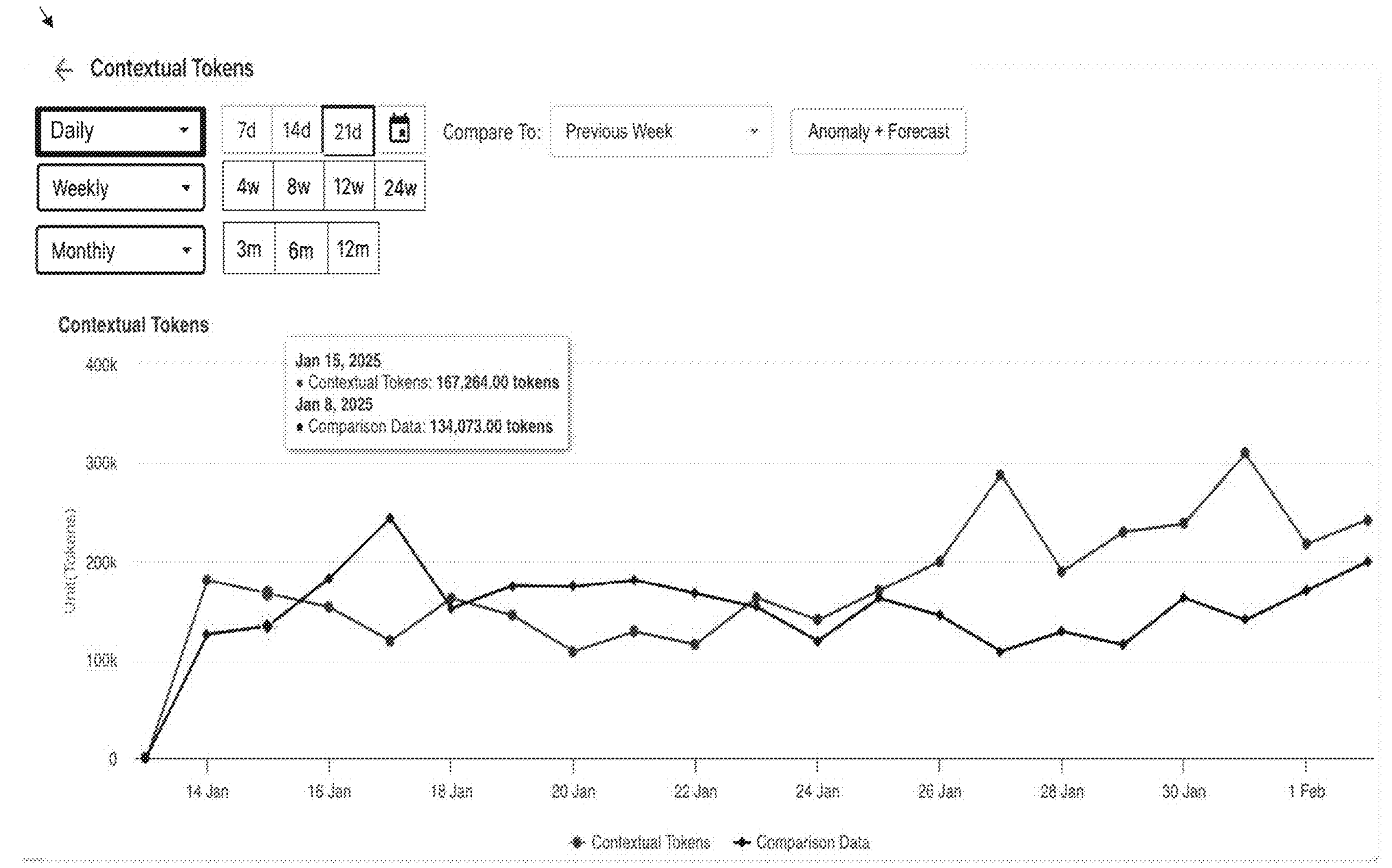

FIG. 12 is a diagram that illustrates the consumption analytics generating engine 214 generates one or more analytics results 1202. The analytics results 1202 may include trends and consumption amounts corresponding to different subscriptions and/or subscription products. The analytics results 1202 in FIG. 12 include a graphical depiction of consumption amounts of a particular subscription product, over a selected time period of 21 days and a daily time scale. The graphical depiction also includes a comparison to consumption amounts of a previous period (e.g., one week prior). For example, the comparison includes a point-by-point comparison between consumption amounts on January 14 verses January 7, January 15 verses January 8, January 16 verses January 9, and so on.

Figure 13:
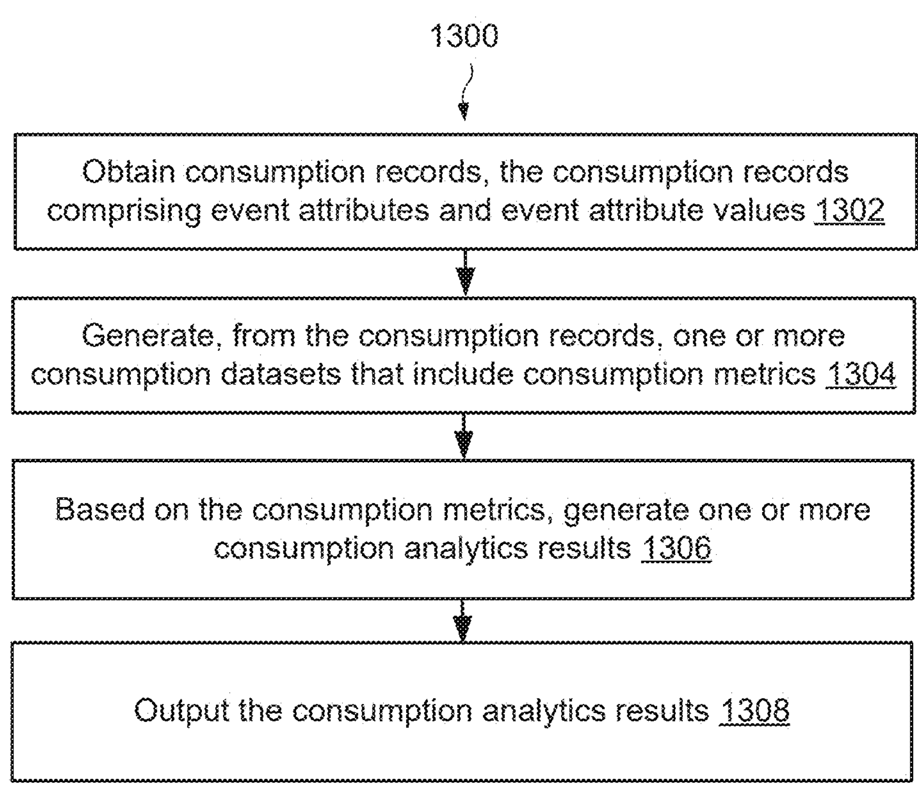
FIG. 13 is a flowchart of a method of intelligently generating consumption analytics, in accordance with some embodiments of the present invention.

FIG. 13 is a flowchart of a method of intelligently generating consumption analytics, in accordance with some embodiments of the present invention. In step 1302, the consumption records obtaining engine 210 may obtain the consumption records 206 from the consumption records database 204. Examples of the consumption records may include the consumption records 302-309 as illustrated in FIGS. 3A-3B. The consumption records 206 may contain event attributes such as consumption amounts and consumption dates and event attribute values corresponding to the different event attributes. The consumption records 206 may be partitioned based on a subset of the event attribute values, such as tenant identifier and/or date. In some embodiments, the consumption records 206 may be partitioned based on other criteria such as a schema of the consumption records 206. In some embodiments, partitioning may include routing each of the consumption records 206 to a different storage partition, as illustrated in FIG. 4. In step 1304, the consumption metrics generating engine 212 may generate consumption metrics which may be represented or stored within consumption datasets. Examples of consumption datasets 502, 512, 522, and 532 are illustrated in FIGS. 5A-5D. Generating of a consumption dataset may facilitate faster data retrieval and faster response time to generate consumption analytics. In some embodiments, generating consumption metrics may be performed at a given frequency, such as hourly, twice per hour, every two hours, daily, or any other frequency. In some embodiments, generating consumption metrics described above may be performed based on a trigger condition, such as an amount of consumption records for which consumption metrics have not been generated exceeding a threshold number. For example, if an amount of consumption records which has not been partitioned exceeds a threshold amount, then the generating of consumption metrics may be triggered.

In step 1306, the consumption analytics generating engine 214 may generate analytics results from the consumption datasets and/or consumption metrics. In step 1308, the consumption analytics generating engine 214 may output the analytics results in a dashboard or report. Examples of outputs of the analytics results are illustrated in FIGS. 6-12.

Figure 14:
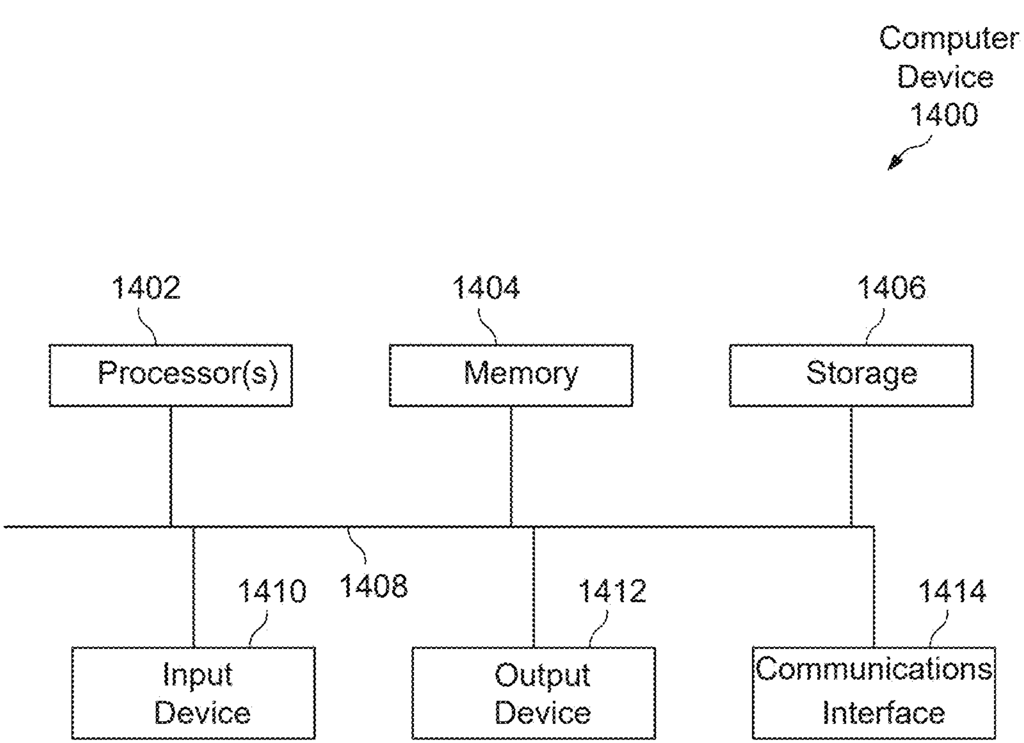
FIG. 14 is a block diagram illustrating details of a computing system.

FIG. 14 is a block diagram of a computing device 1400. Any of the systems, engines, datastores, and/or networks described herein may comprise an instance of one or more computing devices 1400. In some embodiments, functionality of the computing device 1400 is improved to perform some or all of the functionality described herein. The computing device 1400 comprises a processor 1412, memory 1414, storage 1416, an input device 1420, a communication network interface 1424, and an output device 1422 communicatively coupled to a communication channel 1418. The processor 1412 is configured to execute executable instructions (e.g., programs). In some embodiments, the processor 1412 comprises circuitry or any processor capable of processing the executable instructions.

The memory 1414 stores data. Some examples of memory 1414 include storage devices, such as RAM, ROM, RAM cache, virtual memory, etc. In various embodiments, working data is stored within the memory 1414. The data within the memory 1414 may be cleared or ultimately transferred to the storage 1416.

The storage 1416 includes any storage configured to retrieve and store data. Some examples of the storage 1416 include flash drives, hard drives, optical drives, cloud storage, and/or magnetic tape. In some embodiments, storage 1416 may include RAM. Each of the memory 1414 and the storage 1416 comprises a computer-readable medium, which stores instructions or programs executable by processor 1412.

The input device 1420 may be any device that inputs data (e.g., mouse and keyboard). The output device 1422 may be any device that outputs data and/or processed data (e.g., a speaker or display). It will be appreciated that the storage 1416, input device 1420, and output device 1422 may be optional. For example, the routers/switchers may comprise the processor 1412 and memory 1414 as well as a device to receive and output data (e.g., the communication network interface 1424 and/or the output device 1422).

The communication network interface 1424 may be coupled to a network (e.g., the network system 100) via the link 1418. The communication network interface 1424 may support communication over an Ethernet connection, a serial connection, a parallel connection, and/or an ATA connection. The communication network interface 1424 may also support wireless communication (e.g., 802.11 a/b/g/n, WiMax, LTE, WiFi). It will be apparent that the communication network interface 1424 may support many wired and wireless standards.

It will be appreciated that the hardware elements of the computing device 1400 are not limited to those depicted. A computing device 1400 may comprise more or less hardware, software and/or firmware components than those depicted (e.g., drivers, operating systems, touch screens, biometric analyzers, and/or the like). Further, hardware elements may share functionality and still be within various embodiments described herein. In one example, encoding and/or decoding may be performed by the processor 1412 and/or a co-processor located on a GPU (i.e., NVidia).

It will be appreciated that an "engine," "system," "datastore," and/or "database" may comprise software, hardware, firmware, service, microservice, and/or circuitry. In one example, one or more software programs comprising instructions capable of being executable by a processor may perform one or more of the functions of the engines, datastores, databases, or systems described herein. In another example, circuitry may perform the same or similar functions. Alternative embodiments may comprise more, less, or functionally equivalent engines, systems, datastores, or databases, and still be within the scope of present embodiments. For example, the functionality of the various systems, engines, datastores, and/or databases may be combined or divided differently. The datastore or database may include cloud storage. It will further be appreciated that the term "or," as used herein, may be construed in either an inclusive or exclusive sense. Moreover, plural instances may be provided for resources, operations, or structures described herein as a single instance. It will be appreciated that the term "request" shall include any computer request or instruction, whether permissive or mandatory.

The databases/datastores described herein may be any suitable structure (e.g., an active database, a relational database, a self-referential database, a table, a matrix, an array, a flat file, a documented-oriented storage system, a non-relational No-SQL system, and the like), and may be cloud-based or otherwise. References to objects may refer to data representations that include fields and/or attributes that define the data.

The systems, methods, engines, datastores, and/or databases described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The present invention(s) are described above with reference to example embodiments. It will be apparent to those skilled in the art that various modifications may be made and other embodiments may be used without departing from the broader scope of the present invention(s). Therefore, these and other variations upon the example embodiments are intended to be covered by the present invention(s).

The invention claimed is:

1. A multi-tenant system, comprising:

one or more hardware processors; and memory storing computer instructions, the computer instructions when executed by the one or more hardware processors configured to perform:

during a preprocessing phase, obtaining first consumption records for a first one of a plurality of different time windows, the first consumption records comprising first event attributes and first event attribute values, the first consumption records being partitioned into first partitions based on a first subset of the first event attribute values;

generating, in each of the first partitions, for the first one of the plurality of different time windows, one or more first consumption datasets based on the first consumption records, the one or more first consumption datasets comprising first aggregated consumption metrics for the first one of the plurality of different time windows;

obtaining second consumption records for a second one of a plurality of different time windows, the second consumption records comprising second event attributes and second event attribute values, the second consumption records being partitioned into second partitions based on a second subset of the second event attribute values;

generating, in each of the second partitions, for the second one of the plurality of different time windows, one or more second consumption datasets based on the second consumption records, the one or more second consumption datasets comprising second aggregated consumption metrics for the second one of the plurality of different time windows;

during an analytics generation phase, generating consumption analytics results from an evaluation of a trend across the first aggregated consumption metrics for the first one of the plurality of different time windows and the second aggregated consumption metrics for the second one of the plurality of different time windows; and outputting the consumption analytics results.

2. The multi-tenant system of claim 1, wherein the first consumption records are stored in a columnar format or a hybrid format.

3. The multi-tenant system of claim 1, wherein the first subset of the first event attribute values are associated with a particular tenant.

4. The multi-tenant system of claim 1, wherein the first subset of the first event attribute values are associated with a temporal attribute.

5. The multi-tenant system of claim 1, wherein partitioning of the first consumption records is further based on a schema associated with the first consumption records.

6. The multi-tenant system of claim 1, wherein the generating of the consumption analytics results comprises evaluating a trend of an event attribute value over time.

7. The multi-tenant system of claim 6, wherein the evaluating of the trend of the aggregated event attribute value over time is based on a degree of monotonicity of the trend.

8. The multi-tenant system of claim 7, wherein the evaluating of the trend of the trend of the aggregated event attribute value over time is based on a Mann-Kendall statistical test.

9. The multi-tenant system of claim 1, wherein the evaluating of the trend of the trend of the aggregated event attribute value over time is based on an aggregated consumption amount over time.

10. The multi-tenant system of claim 9, wherein the generating consumption analytics results includes aggregating consumption amounts for any of the first consumption records that have a first event attribute value of a common subscriber or a common subscription product.

11. A method implemented by a multi-tenant system, the method comprising:

during a preprocessing phase, obtaining first consumption records for a first one of a plurality of different time windows, the first consumption records comprising first event attributes and first event attribute values, the first consumption records being partitioned into first partitions based on a first subset of the first event attribute values;

generating, in each of the first partitions, for the first one of the plurality of different time windows, one or more first consumption datasets based on the first consumption records, the one or more first consumption datasets comprising first aggregated consumption metrics for the first one of the plurality of different time windows;

obtaining second consumption records for a second one of a plurality of different time windows, the second consumption records comprising second event attributes and second event attribute values, the second consumption records being partitioned into second partitions based on a second subset of the second event attribute values;

generating, in each of the second partitions, for the second one of the plurality of different time windows, one or more second consumption datasets based on the second consumption records, the one or more second consumption datasets comprising second aggregated consumption metrics for the second one of the plurality of different time windows;

during an analytics generation phase, generating consumption analytics results from an evaluation of a trend across the first aggregated consumption metrics for the first one of the plurality of different time windows and the second aggregated consumption metrics for the second one of the plurality of different time windows; and outputting the consumption analytics results.

12. The method of claim 11, wherein the first consumption records are stored in a columnar format or a hybrid format.

13. The method of claim 11, wherein the first subset of the first event attribute values are associated with a particular tenant.

14. The method of claim 11, wherein the first subset of the first event attribute values are associated with a temporal attribute.

15. The method of claim 11, wherein partitioning of the first consumption records is further based on a schema associated with the first consumption records.

16. The method of claim 11, wherein the generating of the consumption analytics results comprises evaluating a trend of an event attribute value over time.

17. The method of claim 16, wherein the evaluating of the trend of the aggregated event attribute value over time is based on a degree of monotonicity of the trend.

18. The method of claim 17, wherein the evaluating of the trend of the trend of the aggregated event attribute value over time is based on a Mann-Kendall statistical test.

19. The method of claim 11, wherein the evaluating of the trend of the trend of the aggregated event attribute value over time is based on an aggregated consumption amount over time.

20. The method of claim 19, wherein the step of generating consumption analytics results includes aggregating consumption amounts for any of the first consumption records that have a first event attribute value of a common subscriber or a common subscription product.

* * * * *